United States Patent
Gligoroski et al.

(10) Patent No.: US 9,866,349 B2
(45) Date of Patent: Jan. 9, 2018

(54) NETWORK CODING OVER GF(2)

(71) Applicant: NORWEGIAN UNIVERSITY OF SCIENCE AND TECHNOLOGY, Trondheim (NO)

(72) Inventors: Danilo Gligoroski, Trondheim (NO); Katina Kralevska, Trondheim (NO)

(73) Assignee: MEMOSCALE AS, Trondheim (NO)

(*) Notice: Subject to any disclaimer, the term of this patent is extended or adjusted under 35 U.S.C. 154(b) by 17 days.

(21) Appl. No.: 14/902,251

(22) PCT Filed: Jun. 24, 2014

(86) PCT No.: PCT/EP2014/063315
§ 371 (c)(1),
(2) Date: Dec. 30, 2015

(87) PCT Pub. No.: WO2015/000750
PCT Pub. Date: Jan. 8, 2015

(65) Prior Publication Data
US 2016/0373210 A1    Dec. 22, 2016

(30) Foreign Application Priority Data
Jul. 4, 2013    (GB) .................................. 1312031.6

(51) Int. Cl.
| | |
|---|---|
| *H04L 1/00* | (2006.01) |
| *H03M 13/37* | (2006.01) |
| *G06F 17/16* | (2006.01) |
| *G06F 17/18* | (2006.01) |
| *H04L 29/06* | (2006.01) |

(52) U.S. Cl.
CPC ............ *H04L 1/0041* (2013.01); *G06F 17/16* (2013.01); *G06F 17/18* (2013.01); *H03M 13/3761* (2013.01); *H04L 1/0076* (2013.01); *H04L 63/04* (2013.01); *H04L 69/22* (2013.01); *H04L 2001/0097* (2013.01)

(58) Field of Classification Search
None
See application file for complete search history.

(56) References Cited

U.S. PATENT DOCUMENTS

| | | | |
|---|---|---|---|
| 3,582,878 A | 6/1971 | Bossen et al. | |
| 2003/0063606 A1* | 4/2003 | Odenwalder | ......... H04L 1/0046 370/389 |

(Continued)

OTHER PUBLICATIONS

Katina Kralevska et al., "Balanced XOR-ed Coding", Springer Link, Lecture Notes in Computer Science, Aug. 28, 2013, vol. 8115, pp. 161-172.

(Continued)

*Primary Examiner* — Kodzovi Acolatse
(74) *Attorney, Agent, or Firm* — Saliwanchik, Lloyd & Eisenschenk

(57) ABSTRACT

Disclosed herein is a method of generating an encoded data packet over GF(2). The method comprises determining 303 a plurality of data packets in dependence on a Latin rectangle, wherein the plurality of data packets have equal length; and generating 305 an encoded data packet by bitwise XORing the determined plurality of data packets. The efficiency of encoding, decoding, and transmission over a network of data packets are all improved, as well as the security properties of the transmitted information.

19 Claims, 9 Drawing Sheets

(56) References Cited

U.S. PATENT DOCUMENTS

| | | | | |
|---|---|---|---|---|
| 2007/0300127 A1* | 12/2007 | Watson | ............... | H03M 13/03 |
| | | | | 714/758 |
| 2009/0113271 A1* | 4/2009 | Bae | .................. | H03M 13/2775 |
| | | | | 714/752 |
| 2010/0011252 A1* | 1/2010 | Rivoir | ................... | G11C 29/56 |
| | | | | 714/32 |

OTHER PUBLICATIONS

Ming Xiao et al., "A Binary Coding Appr4oach for Combination Networks and General Erasure Networks", Information Theory, IEEE International Symposium on, Jun. 24, 2007, pp. 786-790.

Vishnu Namboodiri et al., "Wireless Bidirectional Relaying and Latin Square", IEEE Wireless Communications and Networking Conference, Apr. 1, 2012, pp. 1404-1409.

Moonseo Park et al., "Minimum distortion network code design for source coding over noisy channels", IEEE 19th International Symposium on, Sep. 15, 2008, pp. 1-5 (Abstract is attached).

International Search Report, PCT International Application No. PCT/EP2014/063315, PCT/ISA/210, dated Nov. 5, 2014, 6 sheets.

\* cited by examiner

NETWORK CODING OVER GF(2)

CROSS-REFERENCE TO RELATED APPLICATIONS

This application is a national stage application of International Patent Application No. PCT/EP2014/063315, filed Jun. 24, 2014, which claims priority to Great Britain Application No. 1312031.6, filed Jul. 4, 2013, the disclosures of each of which are incorporated herein by reference in their entirety, including any figures, tables, and drawings.

FIELD OF THE INVENTION

The present invention relates to network coding over GF(2). In particular, embodiments of the invention improve the encoding, decoding and transmission of data packets over a network by determining data packets for encoding over GF(2) in dependence on a Latin rectangle.

BACKGROUND TO THE INVENTION

In the last decade, network coding has attracted a lot of interest. The advantages of network coding include improved throughput, robustness, scalability, and security. The performance gains are achieved by combining algebraically the packets at sources and/or at intermediate nodes in the network.

Network coding was first introduced in the seminal paper by R. Ahlswede, N. Cai, S. Y. R. Li, and R. W. Yeung, Network information flow, IEEE Transactions on Information Theory, 46(4):1204-1216, 2000. Both linear network coding, LNC, and random linear network coding, RLNC, achieve capacity when the field size is sufficiently large. However, performing operations in large finite fields is costly and complex.

RLNC can be several orders of magnitude more energy demanding and up to one order of magnitude slower than the encoding done by simple XOR operations. This has been reported in, for example, H. Shojania and B. Li, Random network coding on the iphone: fact or fiction?, NOSSDAV, 2009; M. V. Pedersen, F. H. P. Fitzek, and T. Larsen, Implementation and performance evaluation of network coding for cooperative mobile devices, In Proc. IEEE Cognitive and Cooperative Wireless Networks Workshop, 2008; and P. Vingelmann, M. V. Pedersen, F. H. P. Fitzek, and J. Heide, Multimedia distribution using network coding on the iphone platform, Proceedings of the 2010 ACM multimedia workshop on Mobile cloud media computing, 2010.

Some of the limitations of RLNC may therefore be overcome by implementing network coding only by XOR operations.

In S. Riis, Linear versus nonlinear boolean functions in network flow, CISS, 2004; it was shown that every solvable multicast network has a linear solution over GF(2). Wireless network coding by sending XORs was presented in S. Katti, H. Rahul, W. Hu, D. Katabi, M. Médard, and J. Crowcroft, XORs in the air: Practical wireless network coding, IEEE/ACM Trans. Netw, 16(3):497-510, 2008; where the main rule is that a node can XOR n packets together only if the next hop has all n−1 packets. The authors in J. Qureshi, Foh Chuan Heng, and Cai Jianfei, Optimal solution for the index coding problem using network coding over gf(2), In Annual IEEE Communications Society Conference on Sensor, Mesh and Ad Hoc Communications and Networks (SECON), pages 209-217, 2012; address the index coding problem by proposing network coding over GF(2). The encoding scheme is based on bitwise XORing by adding redundant bits, and the decoding scheme is based on a simple bit after bit sequential back substitution method.

Usually randomized strategies are used for generating network codes, and not many structured strategies are known. The known structured approaches to network coding are mostly based on combinatorial design theory. Combinatorial design theory is an area of combinatorial mathematics with many communications applications. Sending linear combinations of packets instead of uncoded data offers security against eavesdropping attacks. In N. Cai and R. W. Yeung, Secure network coding, In IEEE International Symposium on Information Theory, page 323, 2002; the authors incorporate network coding and information security based on Shamir's secret sharing algorithm. The authors in K. Harada and H. Yamamoto, Strongly secure linear network coding, IEICE Transactions, 91-A(10):2720-2728, 2008; present an algorithm on how to construct a strongly k-secure network code and how to transform a nonsecure linear network code to a strongly k-secure network code if the alphabet size is sufficiently large. Although there are codes that can empower security in coded networks, the big alphabet size of these coding approaches is not desirable.

Accordingly, a number of problems are experienced by known approaches to network coding.

SUMMARY OF THE INVENTION

Embodiments of the invention improve known techniques of network coding by solving at least some of the above-identified problems. The techniques according to embodiments improve the efficiency of encoding, decoding, and transmission over a network of data packets, as well as improve the security properties of the transmitted information.

According to an aspect of the invention, there is provided a method of generating an encoded data packet over GF(2), the method comprising: determining a plurality of data packets in dependence on a Latin rectangle, wherein the plurality of data packets have equal length; and generating an encoded data packet by bitwise XORing the determined plurality of data packets.

Preferably there is provided a method of generating a plurality of encoded data packets over GF(2), the method comprising the above-described method, the method comprising generating the plurality of encoded data packets by: determining a plurality of data packets for encoding, wherein each of the plurality of data packets is of equal length; determining, for each of a plurality of encoded data packets to be generated, one or more of the plurality of data packets in dependence on the Latin rectangle and, optionally, applied redundancy; generating each of a plurality of encoded data packets by: determining an encoded data packet to be the one data packet determined for the encoded data packet when only one data packet is determined for the encoded data packet, and generating an encoded data packet by bitwise XORing the determined plurality of data packets for the encoded data packet when a plurality of data packets are determined for the encoded data packet.

Preferably the method further comprises: applying redundancy by determining one or more of the data packets to be encoded to be one or more redundant data packets, wherein each redundant data packet is one of the other data packets or a random linear combination of a plurality of the other data packets.

Preferably the method further comprises: determining one or more of the other data packets for generating each redundant data packet such that each generated redundant data packet is different from the other generated redundant data packets; and generating each redundant data packet by bitwise XORing the data packets determined for generating the redundant data packet, when a plurality of data packets are determined for generating the redundant data packet.

Preferably determining one or more of the other data packets for generating each redundant data packet comprises determining the one or more of the other data packets so that they maximise, or substantially maximise, the probability of the encoded data packets being successfully decoded if one or more of the encoded data packets is not received by a decoder.

Preferably the method further comprises including information in each generated encoded data packet, wherein the included information indicates at least the one or more data packets that the encoded data packet has been generated in dependence on.

Preferably the method further comprises determining a first dimension of the Latin rectangle in dependence on the number encoded data packets to be generated for the plurality of data packets to be encoded; and determining a second dimension of the Latin rectangle in dependence on a desired number of data packets that would generate each encoded data packet if redundancy was not applied, wherein the second dimension is less than the first dimension.

Preferably the method further comprises changing the second dimension of the Latin rectangle such that the second dimension is increased in response to a determination to increase the decoding complexity of the encoded data packets, and the second dimension of the Latin rectangle is decreased in response to a determination to decrease the encoding complexity of the encoded data packets.

Preferably the method further comprises generating a Latin rectangle; and generating a non-singular matrix of binary values in dependence on the Latin rectangle; wherein the one or more data packets for generating each encoded data packet are determined in dependence on said non-singular matrix of binary values and, optionally, applied redundancy.

Preferably the method further comprises: generating a Latin rectangle; generating a non-singular matrix of binary values in dependence on the Latin rectangle; and determining the inverse of the non-singular matrix of binary values; wherein the one or more data packets for generating each encoded data packet are determined in dependence on said inverse of the non-singular matrix of binary values and, optionally, applied redundancy.

Preferably the method further comprises generating the Latin rectangle by generating a Latin Square; and selecting a plurality of either the rows or the columns of the Latin Square.

Preferably the method further comprises performing the method in a source of data packets in a network; and transmitting the encoded data packets over the network.

Preferably the method further comprises buffering one or more of the encoded data packets prior to the one or more buffered encoded data packets being transmitted; and transmitting the encoded data packets in a series of phases.

According to a further aspect of the invention, there is provided a method of decoding a plurality of encoded data packets over GF(2), the method comprising: receiving a plurality of encoded data packets that have been generated according to any of the above-described methods; decoding the received encoded data packets in dependence on information included in each received encoded data packet.

According to another further aspect of the invention, there is provided a method in a network, the network comprising a source node, one or more intermediate nodes and at least one destination node, wherein there are a plurality of different routes between the source node and the destination node, the method comprising: generating, by the source node, a plurality of encoded data packets according to any of the above-described methods; and transmitting one or more of the plurality of different encoded data packets between the source and destination nodes over a first route between the source and destination nodes; and transmitting one or more other data packets of the plurality of different encoded data packets between the source and destination node over a second route between the source and destination nodes.

According to another further aspect of the invention, there is provided a method in a network node for generating an encoded data packet over GF(2), wherein the network node comprises stored information on included information in previously received encoded data packets by the network node and information included in previously transmitted encoded data packets by the network node, the method comprising the network node: receiving a plurality of encoded data packets that have been generated according to any of the above-described methods; determining a plurality of the received encoded data packets in dependence on information included in each of the received plurality of data packets and the stored information in the network node, such that a plurality of the received encoded data packets are determined for generating an encoded data packet that is different from any data packets that have been received by the network node or have been transmitted by the network node; and generating an encoded data packet by performing bitwise XOR operations on the determined plurality of received encoded data packets for generating an encoded data packet.

Preferably the method further comprises the network node: including information in each encoded data packet generated by the network node that indicates the data packets that the encoded data packet has been generated in dependence on; transmitting each generated encoded data packet with the included information; and storing the included information in each encoded data packet received by the network node and transmitted by the network node.

According to another further aspect of the invention, there is provided a source for generating encoded data packets, the source being configured to perform any of the above-described methods.

According to another further aspect of the invention, there is provided a network node for receiving and transmitting encoded data packets over a network, the network node being configured to perform any of the above-described methods.

According to another further aspect of the invention, there is provided a destination node for receiving encoded data packets from a network, the destination node being configured to perform any of the above-described methods.

According to another further aspect of the invention, there is provided a network comprising a source configured to perform any of the above-described methods, a destination node configured to perform any of the above-described methods and, optionally, a network node configured to perform any of the above-described methods.

BRIEF DESCRIPTION OF DRAWINGS

Embodiments of the invention will now be described, by way of example only, with reference to the accompanying drawings, in which.

DETAILED DESCRIPTION

Figure 1:
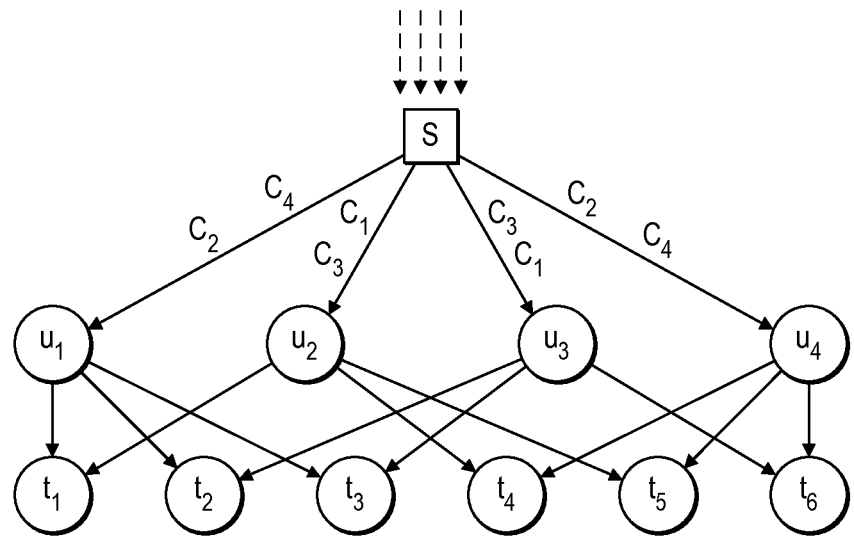
FIG. 1 shows a network over which encoded data packets are transmitted according to a first embodiment of the invention.

Network coding offers improvements in the throughput, efficiency, scalability and security of a network. Embodiments of the invention perform network coding exclusively in GF(2). The coding is therefore always performed by combining data packets of equal lengths with bitwise XOR operations.

According to an embodiment, original packets for encoding by bitwise XOR operations to generate an encoded data packet are determined in dependence on a Latin rectangle. Provided that a sink node receives a predetermined number of linearly independent encoded data packets, the sink node needs only to know the combination of source packets in each received packet in order to correctly decode the encoded data packets. Advantageously, fast and efficient data encoding is performed.

According to an embodiment, a non-singular matrix of binary values is determined in dependence on a Latin rectangle. The encoding of data packets is dependent on the inverse of the non-singular matrix of binary values. This improves the efficiency and speed of a decoder by ensuring that the same number of encoded data packets are required to obtain each decoded data packet.

According to an embodiment, security properties are improved by encoding in dependence on the desired required amount of information for performing a successful decoding and the multipath diversity that is achieved by sending different coded packets on disjoint paths. The transmission of encoded data packets over a network can be performed such that if an eavesdropper wants to reconstruct at least one original packet, then the number of eavesdropped links should be equal to the max-flow of the network.

The network coding according to the embodiments described herein is applicable to data transmission, data storage and/or data handling in all kinds of networks, including: wireless, optical, and storage networks.

Presented first below is the mathematical theory behind encoding and decoding techniques according to embodiments. The techniques are then demonstrated by embodiments of the invention.

According to a first embodiment, data packets are encoded and decoded, with the data packets transmitted over a network that relays the data packets without further coding being performed at intermediate nodes of the network.

A second embodiment is then described in which the encoding process is modified to introduce redundancy into the transmitted data packets. Embodiments that encode with redundancy are particularly advantageous when it is desirable to reduce the amount of loss of data packets in a network.

A third embodiment is then described in which data packets, with or without redundancy, are further coded by intermediate nodes within a network. Advantageously, further coding by intermediate nodes can increase the throughput of a network.

The mathematical theory behind encoding and decoding techniques according to embodiments is provided below.

Let a communication network be defined as a tuple $N=(V, E, S, T)$ that consists of:
a finite directed acyclic multigraph $G=(V, E)$ where V is the set of vertices and E is the set of edges,
a set $S \subset V$ of sources,
a set $T \subset V$ of sink nodes.

Assume that vertex $s \in S$ sends n source packets to vertex $t \in T$ over disjoint paths. A minimal cut separating s and t is a cut of the smallest cardinality denoted as mincut(s, t). The maximum number of packets that can be sent in a phase (a unit time) from s to t is denoted as maxflow(t). A Max-Flow Min-Cut Theorem is described in E. Lawler. Combinatorial Optimization: Networks and Matroids. Dover Publications, 2001. The Max-Flow Min-Cut Theorem indicates that mincut(s, t)=maxflow(t). The multicast capacity, i.e., the maximum rate at which s can transfer information to the sink nodes, cannot exceed the capacity of any cut separating s from the sink nodes. A network is solvable when the sink nodes are able to deduce the original packets with decoding operations. If the network is solvable with linear operations, the network is linearly solvable.

A. XOR-ed Network Coding

It is known that every solvable multicast network has a linear solution over GF(2) in some vector dimension. The essence of the proof relies on the fact that any two finite fields with the same cardinality are isomorphic. Thus, instead of working in a finite field $GF(2^n)$ for which the conditions of the linear-code multicast (LCM) theorem (described as Th. 5.1 in S. Y. R. Li, R. W. Yeung, and N. Cai. Linear network coding. IEEE Transactions on Information Theory, 49(2):371-381, 2003) are met, it is possible to work in the isomorphic vector space $GF(2)^n$ that is an extension field over the prime field GF(2). We formalize the work in the vector space $GF(2)^n$ with the following:

Definition 1: A XOR-ed network coding is a coding that is realized exclusively by bitwise XOR operations between packets with equal length. Hence, it is a parallel bitwise linear transformation of n source bits $x=(x_1, \ldots, x_n)$ by a n×n nonsingular matrix K, i.e., $y=K \cdot x$.

The network capacity with XOR-ed coding can be achieved by increasing the number of phases so that they match the dimension of the extended vector space $GF(2)^n$. The number of phases is denoted by p.

Theorem 1: For any linearly solvable network topology with maxflow $(t_1)>1$, the sufficient condition for a single sink $t_1$ to reach its capacity in each of p phases by XOR-ed coding is to receive n linearly independent packets $x=(x_1, \ldots, x_n)$, where $n=p \times maxflow(t_1)$.

Proof: The network topology is linearly solvable. That means there exists a vector space $GF(2)^n$ where every n source bits can be encoded with a bijective function K, i.e., $y=K \cdot x$. Given that the source s succeeds to send n encoded packets to $t_1$ in p phases, and the max-flow in the network is maxflow $(t_1)>1$, it follows that $n=p \times maxflow(t_1)$ and the sink $t_1$ will receive n packets after p phases via maxflow $(t_1)$ disjoint paths. In order to successfully recover the initial n packets there should be no repetition of any packet, i.e., all the received packets have to be linearly independent.

Based on Theorem 1, the following can be proved:

Theorem 2: For any linearly solvable network topology and for any two sinks $T=\{t_1, t_2\}$ that have maxflow(t)=maxflow($t_1$)=maxflow($t_2$), there always exists a XOR-ed network coding for $n=p \times maxflow(t)$ packets that achieves the multicast capacity in each of p phases.

Proof: For the sink $t_1$ we apply Theorem 1 and find one XOR-ed coding that achieves the capacity in each of p phases. Let us denote by $U_1=\{u_{1,i} | \text{there is an edge}(u_{1,i}, t_1) \in E\}$ the nodes that are directly connected and are sending packets to the sink node $t_1$. We have that $|U_1|=maxflow(t)$, and the set of n packets is partitioned in maxflow(t) disjoint subsets $Y_{1,1}, \ldots, Y_{1,maxflow(t)}$ each of them having p packets. The subset $Y_{1,i}$ comes from the node $u_1$, $i=1, \ldots$, maxflow (t).

The second sink $t_2$ and the set $U_2=\{u_{2,i} | \text{there is an edge}(u_{2,i}, t_2) \in E\}$ of nodes are directly connected and are sending packets to the sink node $t_2$. The intersection between the sets of nodes $U_1$ and $U_2$ is denoted as $U_{1,2}=U_1 \cap U_2$. Consider the following three situations:

1) There are no mutual nodes that are sending packets to both sinks $t_1$ and $t_2$, i.e., $U_{1,2}=\emptyset$. In that case find one partition of the set of n packets in maxflow(t) disjoint subsets $\Gamma_1=\{Y_{2,1} \ldots, Y_{2,maxflow(t)}\}$ each of them having p packets. The sets of packets $Y_{2,j}$ should be delivered to the sink $t_2$ via the node $u_{2,j}$, $j=1, \ldots$, maxflow(t). The multicast capacity for the sink $t_2$ is achieved in each of p phases.

2) There are nodes that are sending packets to both sinks $t_1$ and $t_2$, i.e., $U_{1,2}=\{u_{(1,2)v1}, \ldots, u_{(1,2)vk}\}$. Denote the nodes that are in $$U_2 \setminus U_1 = \{u_{2_{v1}}, \ldots, u_{2_{v1_{maxflow(t)-k}}}\}.$$

In that case, the sink $t_2$ receives from the nodes in $U_{1,2}$ the same packets that are delivered to the sink $t_1$. The number of the remaining packets that have to be delivered to $t_2$ is exactly $p \times (maxflow(t)-k)$. Find one partition of maxflow (t)–k disjoint subsets $\Gamma_2=\{Y_{2,1} \ldots, Y_{2,maxflow(t)-k}\}$ each of them having p packets. The sets of packets $Y_{2,j}$ should be delivered to the sink $t_2$ via the node $u_{2,vj}$, $j=1, \ldots$ maxflow (t)–k. The network capacity for the sink $t_2$ is achieved in each of p phases.

3) All the nodes that are sending packets to the sink $t_1$, send the packets to the sink $t_2$ as well, i.e., $U_{1,2}=U_1 \cap U_2=U_1$. In that case, the sink $t_2$ receives from the nodes in $U_{1,2}$ the same packets that are delivered to the sink $t_1$. The network capacity for the sink $t_2$ is achieved in each of p phases.

Combining the construction of generic linear codes presented in the LCM theorem, the transformation to equivalent codes over $GF(2)n$ and the Theorems 1 and 2, there follows:

Theorem 3: For any linearly solvable network topology and for any set of N sinks $T=\{t_1, \ldots, t_N\}$ that have maxflow(t)=maxflow($t_1$)= . . . =maxflow($t_N$), there always exists a XOR-ed network coding for $n=p \times maxflow(t)$ packets that achieves the multicast capacity in each of p phases.

Proof: The proof is an application of the mathematical induction by the number of sinks N. Suppose that the claim of the theorem is correct for N–1 sinks. By adding a new N-th sink, consider again three possible situations as in Theorem 2.

B. XOR-ed Coding from Combinatorial Designs: Latin Squares and Latin Rectangles

Instead of using completely random binary matrices, embodiments of the invention use nonsingular binary matrices that have some specific structure related to some randomly generated Latin square or Latin rectangle. By abandoning a totally random generation of the encoding schemes, the space of possible random linear network encoding schemes is not reduced since the number of Latin squares and Latin rectangles of order n increases proportionally with the factorial of n. Therefore, in the approach according to embodiments there is a virtually endless repository of encoding schemes that have the benefits from both worlds: they are randomly generated, but they have an advantageous certain structure and offer improved security properties.

The following definitions are provided in D. R. Stinson. Combinatorial Designs: Constructions and Analysis Springer Verlag, 2003 and C. J. Colbourn and J. H. Dinitz. Handbook of Combinatorial Designs, Second Edition (Discrete Mathematics and Its Applications). Chapman, Hall/CRC, 2006.

Definition 2: A Latin square of order n with entries from an n-set X is an n×n array L in which every cell contains an element of X such that every row of L is a permutation of X and every column of L is a permutation of X.

Definition 3: A k×n Latin rectangle is a k×n array (where k≤n) in which each cell contains a single symbol from an n-set X, such that each symbol occurs exactly once in each row and at most once in each column.

For generating a Latin square, one can always start with a permutation of n elements that is a trivial 1×n Latin rectangle and can use the old Hall's marriage theorem (described in P. Hall. On representatives of subsets. J. London Math. Soc., 10(37):26-30, 1935) to construct new rows until the whole Latin square is completed. The approach can be used to build a Latin rectangle of a desired size. However, this approach does not ensure that the generated Latin squares are chosen uniformly at random. In order to generate Latin squares of order n that are chosen uniformly at random, an alternative approach uses the algorithm of Jacobsen and Matthews (described in M. T. Jacobson and P. Matthews. Generating uniformly distributed random latin squares. Journal of Combinatorial Designs, 4(6):405-437, 1996). The alternative approach then splits the Latin square into two Latin rectangles (upper and lower), and uses the algebraic objects (matrices or block designs) that are related to either the upper or the lower Latin rectangle.

As a convention, throughout the present document, the number of packets n that are sent from the source is equal to the number of columns in the Latin square or Latin rectangle.

Definition 4: Let (X, A) be a design where $X=\{x_1, \ldots, x_v\}$ and $A=\{A_1, \ldots, A_b\}$. The incidence matrix of (X, A) is the v×b 0-1 matrix $M=(m_{i,j})$ defined by the $$\text{rule } m_{i,j} = \begin{cases} 1, & \text{if } x_i \in A_j, \\ 0, & \text{if } x_i \notin A_j. \end{cases}$$

Proposition 1: The incidence matrix $M=(m_{i,j})$ of any Latin rectangle with dimensions k×n is a balanced matrix with k ones in each row and each column.

Proof: From the definition of the incidence matrix it follows that the number of ones in each row is equal to the number of elements k in each column of the Latin rectangle. On the other hand, since each row of the Latin rectangle is a permutation of n elements, and there are no elements that occur twice in each column, the number of ones in each column can be neither less nor bigger than k.

Note 1: The incidence matrix M of a k×n Latin rectangle is always balanced. However, the inverse matrix of the incidence matrix $M^{-1}$ is not always balanced.

Proposition 2: The necessary condition for an incidence matrix $M=(m_{i,j})$ of a k×n Latin rectangle to be nonsingular in GF(2) is k to be odd, i.e., k=2l+1.

Proof: Assume that k is even, i.e., k=2l. Recall that a matrix M is nonsingular in GF(2) if and only if its determinant is 1 (or it is singular if and only if its determinant is 0). Recall further the Leibniz formula for the determinant of an n×n matrix M: $\det(M)=\Sigma_{\sigma \in S_n} \text{sgn}(\sigma)\Pi_{i=1}^{n} m_{i,\sigma_i}$, where the sum is computed over all elements of the symmetric group of n elements $S_n$, i.e., over all permutations $\sigma \in S_n$, and $\text{sgn}(\sigma)$ is the signature (or the parity of the permutation) whose value is +1 or −1. The elements $m_{i,\sigma_i}$ are the elements $m_{i,j}$ of the matrix M where the value for the index $j=\sigma_i$ is determined as the i-th element of the permutation σ.

If k=2l is even, from Proposition 1 and from the fact that operations are performed in GF(2), it follows that every summand in the Leibniz formula gives an even number of non-zero products, thus the final sum must be even, i.e., the determinant in GF(2) is 0.

A direct consequence from Theorem 1 is the following:

Corollary 1: A sink node t ∈T with maxflow(t) can receive n source packets, encoded with the incidence matrix of a k×n Latin rectangle in GF(2), in $$p = \left\lceil \frac{n}{\text{maxflow}(t)} \right\rceil$$

phases. In each phase the sink node reaches its maxflow(t).

The approach increases the delay and the number of packets that have to be kept in the buffer of the sink in order to decode the packets. However, the development of the networking equipment in the last three decades has been accompanied by a significant increasing of the buffer size. Using a small part of a buffer for performing XOR-ed network coding that achieves the multicast capacity pays-off the costs that are introduced by the delay and the used buffer. Additionally, XOR-ed coding is several orders of magnitude less energy demanding than any other type of coding.

The work with incidence matrices related to randomly generated Latin rectangles is actually a work with balanced block designs. However, it is not necessary for both the incidence matrix and its inverse matrix to be completely balanced. Accordingly, if the primary interest is complexity of decoding and the security issue of the conditions required for an adversary to successfully decode some sniffed packets, then the easiest way to address these issues is to give an equal level of security to all encoded packets. In the approach according to embodiments this can be easily achieved by switching the roles of the incidence matrix and its inverse matrix: the encoding of the source packets is therefore done with the inverse matrix of the incidence matrix and the decoding of the coded packets is done with the incidence matrix. By applying this alternative approach, decoding of any of the source packets requires an equal number of coded packets.

Corollary 2: For each value of maxflow(t) and a number of source packets n which is multiple of maxflow(t), there exists a Latin rectangle with n−1 or n−2 rows and its incidence matrix can be used for decoding.

Theorem 4: When decoding is performed with the incidence matrix from Corollary 2, any eavesdropper needs to listen at least maxflow(t) links in order to decode at least one source packet.

Proof: Assume that an adversary eavesdrops maxflow(t)−1 links. Since the incidence matrix used for decoding is related to a Latin rectangle with n−1 or n−2 rows, eavesdropping "just" maxflow(t)−1 links is not sufficient for the adversary to receive at least one subset of n−1 or n−2 packets from which he/she can decode at least one original packet.

A remark that can be given about the approach according to embodiments is that the number of XOR operations between different packets (both in the source and in the sink nodes) is relatively high. This can be addressed by using Latin rectangles with smaller number of rows as a trade-off between the number of encoding/decoding operations and the ability of an adversary to decode a source packet. Namely, the encoding and decoding efforts at the source and sink node are the highest when encoding and decoding requires n−1 or n−2 packets. In order to decrease the number of operations at the nodes, the Latin rectangle should have k≤n−2 rows. To reduce the number k without reducing the number of links that have to be listened by an eavesdropper in order to decode at least one original packet. The following theorem gives the necessary and sufficient condition for that to happen:

Theorem 5: Let the coding be done by $M^{-1}$ obtained from a Latin rectangle $L_{k \times n}$ of size k×n, where k≤n−2. Further, let the transfer be done by sending n packets from s to t in $$p = \left\lceil \frac{n}{\text{maxflow}(t)} \right\rceil$$

phases on maxflow(t) disjoint paths and let the sets of indexes of the packets sent via i-th disjoint path be denoted by $S_i$, i=1, . . . , maxflow(t). A necessary and sufficient condition for an eavesdropper to need to listen at least maxflow(t) links in order to decode at least one original packet is:

$$\forall j \in \{1, \ldots, n\}, \forall i \in \{1, \ldots, \text{maxflow}(t)\}: \quad L_{k,j} \cap S_i \neq \emptyset, \quad (1)$$

where $L_{k,j}$, $j \in \{1, \ldots, n\}$ is the set of elements in the j-th column of the Latin rectangle $L_{k \times n}$.

Proof: To show that the condition (1) is necessary, assume that an eavesdropper needs maxflow(t)−1 links in order to decode one original packet $x_l$, and let us denote by $S_m$ the set of indexes of the packets sent via the disjoint path that was not listened by the eavesdropper. This means that for the l-th column $L_{k \times l}$ of the Latin rectangle $L_{k \times n}$: $L_{k,l} \cap S_m = \emptyset$ which violates the condition (1).

To show that the condition (1) is sufficient, denote by $S_{i,j} = L_{k,j} \cap S_i$, $j \in \{1, \ldots, n\}$, $i \in \{1, \ldots, \text{maxflow}(t)\}$. It is sufficient to notice that $S_{i,j}$ are disjunctive partitions for every set $L_{k,j}$, i.e., $$\forall j \in \{1, \ldots, n\}: \bigcup_{i=1}^{\text{maxflow}(t)} S_{i,j} = L_{k,j} \text{ and}$$

$$\forall j_1, j_2 \in \{1, \ldots, n\}: S_{i,j_1} \cap S_{i,j_2} = \emptyset.$$

Since $|L_{k,j}| = k$, and the encoding of original n packets is done by $M^{-1}$, it follows that an eavesdropper can only decode an original packet by listening to at least maxflow(t) links.

The following provides some of the mathematical theory behind coding techniques for erasure codes according to embodiments. A definition is provided of a family of optimal binary non-MDS erasure codes.

Let us denote $F_q = GF(q)$ the Galois field with q elements and by $F_q^n$ the n-dimensional vector space over $F_q$. Let us also denote by $[n, k]_q$ the q-ary linear code of length n and rank k which is actually a linear subspace C with dimension k of the vector space $F_q$. An $[n, k, d]_q$ code is an $[n, k]_q$ code with minimum weight at least d among all non-zero codewords. An $[n, k, d]_q$ code is called maximum distance separable, MDS, if d=n−k+1. The Singleton defect of an $[n, k, d]_q$ code C defined as $s(C)=n-k+1-d$ measures how far away is C from being MDS.

Provided below are some basic properties for MDS matrices:

Proposition ER1 (as described in F. J. MacWilliams and N. J. A. Sloane. The Theory of Error-Correcting Codes. North-holland Publishing Company, 2nd edition, 1978; Ch. 11, Corollary 3): Let C be an [n, k, d] code over GF(q). The following statements are equivalent:

1. C is MDS;
2. every k columns of a generator matrix G are linearly independent;
3. every n−k columns of a parity check matrix H are linearly independent.

Definition ER1: Let C be an [n, k] code over GF(q) with a generator matrix G. Let us denote by $G_I$, I=k, ..., n the sets of submatrices obtained from G when choosing I columns from G, and by $D_I \subset G_I$, I=k, ..., n the subsets of GI with a rank k. We call the following vector $V_D = (\rho_0, \rho_1, \ldots, \rho_{n-k}), \rho_i = |D_{i=k}|/|G_{i+k}|$, the Vector of Exact Decoding Probability, for the code C.

In other words, the value $\rho_i$, represents the probability that we can decode all k original values $x_1, \ldots, x_k$, if we are given k+i values $y_1, \ldots, y_{k+i}$, that corresponds to encoding with k+i columns of the generator matrix G.

For random generator matrices G, the values of $V_D$ are calculated, as described in Oscar Trullols-Cruces, Jose Maria Barcelo-Ordinas, and Marco Fiore., 'Exact decoding probability under random linear network coding' 2011; and we formulate them in the following Proposition:

Proposition ER2: For a linear [n, k] code over GF(q) with a random generator matrix G the elements of the vector $V_D = (\rho_0, \rho_1, \ldots, \rho_{n-k})$ have the following values:

$$\rho_I = P(k+i), \quad (ER1)$$

where the values P(I) are computed as follows:

$$P(I) = \begin{cases} 0 & \text{if } I < k, \\ \prod_{j=0}^{k-1} \left(1 - \frac{1}{q^{I-j}}\right) & \text{if } I \geq k. \end{cases} \quad (ER2)$$

Proof: The equation (ER2) is actually the equation (7) provided in Oscar Trullols-Cruces, Jose Maria Barcelo-Ordinas, and Marco Fiore., 'Exact decoding probability under random linear network coding' 2011; with notation consistent with the standard notation for linear [n, k] codes over GF(q). The equation (ER1) then follows directly.

The connection between the Vector of Exact Decoding Probability and the MDS codes can be established by using the Proposition ER2 as follows:

Theorem ER1: A linear [n, k] code C over GF(q) with a generator matrix G is an MDS code iff the Vector of Exact Decoding Probability is the following vector $V_D(\rho_0, \rho_1, \ldots, \rho_{n-k}) = (1, 1, \ldots, 1)$.

Proof: The theorem can be proved with a direct application of the Proposition ER2 and the Definition ER1.

Embodiments exclusively concern operations with linear binary codes. Thus, our interest is to define a class of binary codes that in some properties are as close as possible to MDS codes. Unfortunately, it is a well known old fact in coding theory (see for example, F. J. MacWilliams and N. J. A. Sloane. The Theory of Error-Correcting Codes. North-holland Publishing Company, 2nd edition, 1978) that for the case of linear binary codes, all MDS codes are trivial, i.e. k=1 or n=k+1 or n=k.

So, dealing with the fact that non-trivial binary codes are not MDS, we adopt a strategy to search for codes that will be optimal from certain perspective according to the Vector of Exact Decoding Probability $V_D$. When a channel has an erasure probability p the strategy will be to find binary codes that maximize the probability to recover the original data. Therefore, we prove the following Theorem:

Theorem ER2: Let C be a binary linear [n, k] code with a Vector of Exact Decoding Probability $V_D = (\rho_0, \rho_1, \ldots, \rho_{n-k})$ and let k packets be encoded by C. The probability $p_s$ of successful decoding of k packets from n encoded and transmitted packets via a channel with an erasure probability p is:

$$p_s = 1 - \left( \sum_{i=0}^{n-k} \binom{n}{i} p^i (1-p)^{n-i} (1 - \rho_{n-k-i}) + \sum_{i=n-k+1}^{n} \binom{n}{i} p^i (1-p)^{n-i} \right) \quad (ER3)$$

Proof: Let us denote by $E_1$ the event that i packets, where $0 \leq i \leq n-k$, are lost during the transmission, and by $E_2$ the event that more than n−k packets from the set of all n packets are lost during the transmission.

The probability of the event $E_1$ is calculated by the expression:

$$P(E_1) = \sum_{i=0}^{n-k} \binom{n}{i} p^i (1-p)^{n-i}, \quad \text{(ER4)}$$

and the probability of the event $E_2$ is:

$$P(E_2) = \sum_{i=n-k+1}^{n} \binom{n}{i} p^i (1-p)^{n-i} \quad \text{(ER5)}$$

From expression (ER4) we compute the probability $p_{u_1}$ of failure to decode k original packets, by multiplying every value in the sum by the opposite probability of successful decoding when n−k−i columns of the generator matrix G are received, i.e., when i packets are lost. So decoding failure probability if i packets are lost (0≤i≤n−k) is computed by the following expression:

$$p_{u_1} = \sum_{i=0}^{n-k} \binom{n}{i} p^i (1-p)^{n-i} (l - \varrho_{n-k-i}) \quad \text{(ER6)}$$

If more than n−k packets are lost then the probability of failing to successfully decode is 100% thus the probability $P_{u_2}$ of failing to decode k original packets is equal to $P(E_2)$, i.e., $p_{u_2} = P(E_2)$.

In total, the probability of unsuccessful decoding $p_u$ is:

$$p_u = p_{u_1} + p_{u_2} = \quad \text{(ER7)}$$

$$= \sum_{i=0}^{n-k} \binom{n}{i} p^i (1-p)^{n-i} (l - \varrho_{n-k-i}) + +$$

$$\sum_{i=n-k+1}^{n} \binom{n}{i} p^i (1-p)^{n-i}$$

Finally, the probability $p_s$ of successful decoding of k packets is the opposite probability of $p_u$ i.e., $$p_s = 1 - p_u.$$

Having defined the probability $p_s$ of successful decoding of k packets that are encoded with an [n, k] binary code, we define a Family of Optimal Binary Non-MDS Erasure Codes as follows:

Definition ER2: Let C be a family of binary linear [n, k] codes that have a probability $p_s$ of successful decoding k packets from n encoded and transmitted packets via a channel with an erasure probability p. We say that C is a Family of Optimal Binary Non-MDS Erasure Codes if for every binary linear [n, k] code $C^I$ with a probability $p'_s$ of successful decoding of k packets in a channel with an erasure probability p, there exist a code C ∈ C with a probability $p_s$ of successful decoding, such that $p^I \leq p_s$, for every erasure probability p.

The first embodiment described below demonstrates the advantages of encoding and decoding according to the above-described techniques. The maxflow is reached in a single source multicast network with delay when the coding is in GF(2).

As shown in FIG. 1, it is desired for the source to send four packets $x_1, \ldots, x_4$ to the sink nodes, and that each sink node has maxflow($t_k$)=2, (k=1, . . . , 6). The sink nodes receive data from pairs of intermediate nodes, $u_i$, (i=1, . . . , 4). The aim is for all six sink nodes to be able to reconstruct the source packets that are exclusively coded in GF(2).

The approach to selecting encoding functions in GF(2) by using Latin rectangles is now demonstrated. The buffer size is doubled, i.e., the delay is doubled. Following Corollary 1 the number of phases in which packets are sent depends from the total number of packets and maxflow($t_k$). The source sends packets in 2 phases and the order of the Latin square is four. The following Latin square is generated, using any of the previously described techniques, and split into two Latin rectangles:

$$L = \begin{bmatrix} 2 & 4 & 1 & 3 \\ 1 & 3 & 2 & 4 \\ 3 & 2 & 4 & 1 \\ 4 & 1 & 3 & 2 \end{bmatrix}$$

Each column from the 3×4 upper Latin rectangle represents a combination of source packets in a coded packet $c_i$, i=1, . . . , 4. The corresponding 4×4 incidence matrix is nonsingular in GF(2) (Proposition 2). M is represented as:

$$M = \begin{bmatrix} 1 & 1 & 1 & 0 \\ 0 & 1 & 1 & 1 \\ 1 & 1 & 0 & 1 \\ 1 & 0 & 1 & 1 \end{bmatrix}$$

Each row of M has been constructed in dependence on a column of the 3×4 Latin rectangle. The first column of the Latin rectangle specifies bit positions 2, 1 and 3. The first row of M therefore has '1's in bit positions 2, 1 and 3 and a '0' in the bit position that was not identified by the first column of the Latin rectangle. Similarly, the second column of the Latin rectangle specifies bit positions 4, 3 and 2. The second row of M therefore has '1's in bit positions 4, 3 and 2 and a '0' in the bit position that was not identified by the second column of the Latin rectangle. Rows 3 and 4 of M have been similarly constructed in dependence on the columns of L.

Using M the source computes the vector of coded packets as:

$$c = Mx = [c_1, c_2, c_3, c_4]^T$$

where $x = [x_1, x_2, x_3, x_4]^T$ is a vector of the source packets. The coded packets are XOR-ed combinations of the source packets, i.e., $$c_1 = x_1 \oplus x_2 \oplus x_3,$$

$$c_2 = x_2 \oplus x_3 \oplus x_4,$$

$$c_3 = x_1 \oplus x_2 \oplus x_4,$$

$$c_4 = x_1 \oplus x_3 \oplus x_4$$

The source packets that are used to generate each encoded data packets are therefore determined in dependence on the '1's in each row of M.

The source further includes, for example by prepending as a header, the information from the incidence matrix to each of the coded packets. The vector of packets that are sent becomes as follows:

$$C=\{(4,1110, c_1), (4,0111, c_2), (4,1101, c_3), (4,1011, c_4)\}=\{C_1, C_2, C_3, C_4\}$$

The sink nodes receive in each phase a pair of different packets as shown in Table 1. Their buffer should be large enough to store the received packets $C_i$, i=1, . . . , 4.

TABLE 1

|  | $t_1$ | $t_2$ | $t_3$ | $t_4$ | $t_5$ | $t_6$ |
|---|---|---|---|---|---|---|
| First phase | $C_4, C_1$ | $C_4, C_3$ | $C_4, C_3$ | $C_1, C_2$ | $C_1, C_2$ | $C_3, C_2$ |
| Second phase | $C_2, C_3$ | $C_2, C_1$ | $C_2, C_1$ | $C_3, C_4$ | $C_3, C_4$ | $C_1, C_4$ |

The decoding at the sink nodes is performed by $M^{-1}$. Each sink node computes $M^{-1}$ from the prepended indexes. The original packets xi, i=1, . . . , 4, are reconstructed as $x=M^{-1}c$.

Figure 2:
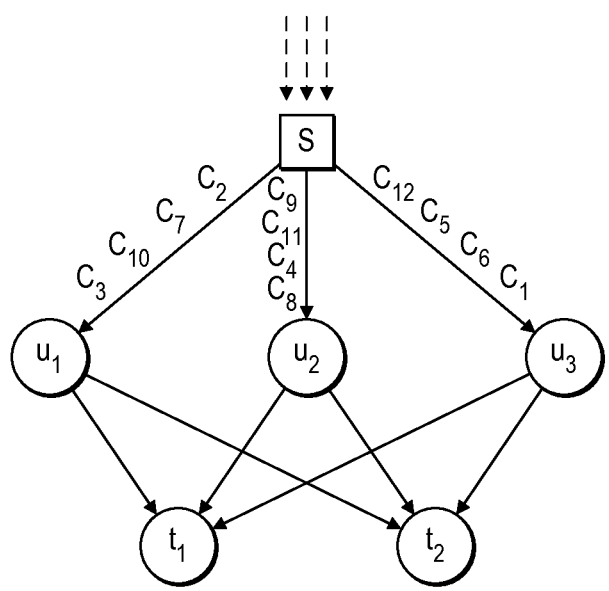
FIG. 2 shows a network over which encoded data packets are transmitted according to the first embodiment of the invention.

Another example is now presented that illustrates the security provided by the encoding approach according to embodiments. The goal is to provide a secure communication technique by ensuring that a passive adversary is able to reconstruct n source packets only when at least maxflow(t) links are eavesdropped. By sending XOR-ed packets on disjoint paths (exploiting the path diversity), an adversary is unable to decode the message even though several paths are eavesdropped. FIG. 2 shows a network in which a source s communicates with two sinks $t_1$ and $t_2$ via intermediate nodes ui , i=1, 2, 3, and sends twelve packets to $t_1$ and $t_2$. Packets are sent in four phases since maxflow(t)=3. The following 5×12 Latin rectangle is generated using any of the previously described techniques:

$$L_{5\times12} = \begin{bmatrix} 4 & 2 & 11 & 8 & 12 & 1 & 9 & 5 & 10 & 7 & 6 & 3 \\ 2 & 8 & 12 & 3 & 6 & 10 & 4 & 11 & 5 & 1 & 9 & 7 \\ 3 & 4 & 2 & 9 & 11 & 12 & 5 & 6 & 7 & 8 & 10 & 1 \\ 9 & 10 & 1 & 6 & 3 & 7 & 2 & 8 & 4 & 11 & 12 & 5 \\ 6 & 5 & 7 & 10 & 1 & 11 & 8 & 3 & 12 & 4 & 2 & 9 \end{bmatrix}$$

The encoded data packets determined in dependence on the Latin rectangle are:

$c_1=x_2 \oplus x_3 \oplus x_4 \oplus x_6 \oplus x_9$, $c_2=x_2 \oplus x_4 \oplus x_5 \oplus x_8 \oplus x_{10}$, $c_3=x_1 \oplus x_2 \oplus x_7; \oplus x_{11}; \oplus x_{12}$, $c_4=x_3 \oplus x_6 \oplus x_8 \oplus x_9 \oplus x_{10}$, $c_5=x_1 \oplus x_3 \oplus x_6 \oplus x_{11} \oplus x_{12}$, $c_6=x_1 \oplus x_7 \oplus x_{10} \oplus x_{11} \oplus x_{12}$, $c_7=x_2 \oplus x_4 \oplus x_5 \oplus x_8 \oplus x_9$, $c_8=x_3 \oplus x_5 \oplus x_6 \oplus x_8 \oplus x_{11}$, $c_9=x_4 \oplus x_5 \oplus x_7 \oplus x_{10} \oplus x_{12}$, $c_{10}=x_1 \oplus x_4 \oplus x_7 \oplus x_8 \oplus x_{11}$, $c_{11}=x_2 \oplus x_6 \oplus x_9 \oplus x_{10} \oplus x_{12}$, $c_{12}=x_1 \oplus x_3 \oplus x_5 \oplus x_7 \oplus x_9$. (2)

The sink nodes reconstruct the source packets with $M^{-1}$. The original data packets are therefore reconstructed from the encoded data packets according to the following:

$x_1=c_2 \oplus c_5 \oplus c_{10} \oplus c_{11} \oplus c_{12}$, $x_2=c_1 \oplus c_3 \oplus c_5 \oplus c_6 \oplus c_7 \oplus c_9 \oplus c_{10}$, $x_3=c_3 \oplus c_5 \oplus c_6 \oplus c_7 \oplus c_8 \oplus c_9 \oplus c_{12}$, $x_4=c_4 \oplus c_5 \oplus c_6 \oplus c_7 \oplus c_8 \oplus c_9 \oplus c_{10} \oplus c_{11} \oplus c_{12}$, $x_5=c_1 \oplus c_2 \oplus c_4$, $x_6=c_1 \oplus c_2 \oplus c_4 \oplus c_6 \oplus c_7 \oplus c_{10} \oplus c_{11}$, $x_7=c_2 \oplus c_3 \oplus c_4 \oplus c_5 \oplus c_6 \oplus c_7 \oplus c_8 \oplus c_{11} \oplus c_{12}$, $x_8=c_1 \oplus c_3 \oplus c_5 \oplus c_7 \oplus c_8 \oplus c_9 \oplus c_{10} \oplus c_{11} \oplus c_{12}$, $x_9=c_1 \oplus c_2 \oplus c_5 \oplus c_9 \oplus c_{10}$, $x_{10}=c_1 \oplus c_5 \oplus c_7 \oplus c_9 \oplus c_{10}$, $x_{11}=c_1 \oplus c_7 \oplus c_8$, $x_{12}=c_3 \oplus c_4 \oplus c_5 \oplus c_7 \oplus c_9$. (3)

Accordingly, the encoding of the data packets is balanced since the same number of source data packets are required to generate each encoded data packet. The decoding of the data packets, however, is not balanced and not all packets have the same level of decoding complexity, as demonstrated by relations (2) and (3). For instance, to decode $x_4$, $x_7$ and $x_8$ nine coded packets are needed, whereas to decode $x_5$ and $x_{11}$, just three packets are needed.

The non-balanced complexity in the decoding can be avoided by encoding in dependence on $M^{-1}$ and performing the decoding by M. When s computes the vector of coded packets as $c=M^{-1}x$, then the coded packets $c_i$, i=1, . . . , 12 are XOR-ed combinations of different number of source packets. The decoding of packets, however, is done with a balanced matrix, i.e., x=Mc.

The data packets for generating each encoded data packet are therefore:

$c_1=x_2 \oplus x_5 \oplus x_{10} \oplus x_{11} \oplus x_{12}$, $c_2=x_1 \oplus x_3 \oplus x_5 \oplus x_6 \oplus x_7 \oplus x_9 \oplus x_{10}$, $c_3=x_3 \oplus x_5 \oplus x_6 \oplus x_7 \oplus x_8 \oplus x_9 \oplus x_{12}$, $c_4=x_4 \oplus x_5 \oplus x_6 \oplus x_7 \oplus x_8 \oplus x_9 \oplus x_{10} \oplus x_{11} \oplus x_{12}$, $c_5=x_1 \oplus x_2 \oplus x_4$, $c_6=x_1 \oplus x_2 \oplus x_4 \oplus x_6 \oplus x_7 \oplus x_{10} \oplus x_{11}$, $c_7=x_2 \oplus x_3 \oplus x_4 \oplus x_5 \oplus x_6 \oplus x_7 \oplus x_8 \oplus x_{11} \oplus x_{12}$, $c_8=x_1 \oplus x_3 \oplus x_5 \oplus x_7 \oplus x_8 \oplus x_9 \oplus x_{10} \oplus x_{11} \oplus x_{12}$, $c_9=x_1 \oplus x_2 \oplus x_5 \oplus x_9 \oplus x_{10}$, $c_{10}=x_1 \oplus x_5 \oplus x_7 \oplus x_9 \oplus x_{10}$, $c_{11}=x_1 \oplus x_7 \oplus x_8$, $c_{12}=x_3 \oplus x_4 \oplus x_5 \oplus x_7 \oplus x_9$. (4)

The packets for generating an encoded data packet according to relation (4) above correspond to the encoded data packets for generating an original data packet according to relation (3). Decoding data packets encoded according to relation (4) requires a similarly corresponding relation to relation (2) and the decoding would therefore be balanced.

The routing of the encoded data packets in FIG. 2 is as follows: on the first path the source sends ($C_3$, $C_{10}$, $C_7$, $C_2$), on the second path ($C_8$, $C_4$, $C_{11}$, $C_9$) and ($C_1$, $C_6$, $C_5$, $C_{12}$) on the third path. It is clear that an encoded data packets sent on each of the three disjoint paths is present in every column of the Latin rectangle $L_{5 \times 12}$. This demonstrates the condition (1) in Theorem 5. Namely, the data packets are transmitted with high security since in order to reconstruct at least one source packet, an adversary should eavesdrop at least 3 links.

Figure 3:
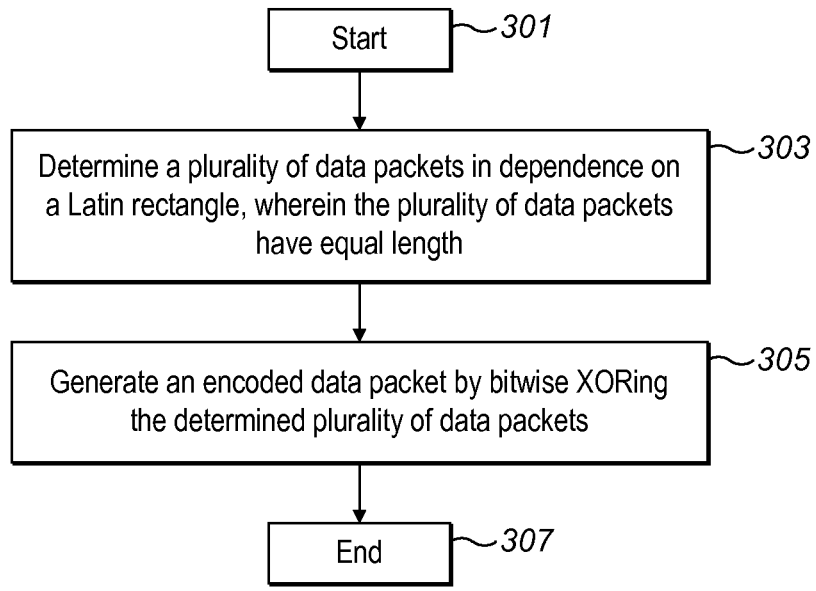
FIG. 3 is a flow chart of a method of encoding according to the first embodiment of the invention.

A method of encoding according to the first embodiment is described below with reference to FIG. 3.

In step 301, the process begins.

Step 303 comprises determining a plurality of data packets in dependence on a Latin rectangle, wherein the plurality of data packets have equal length.

Step 305 comprises generating an encoded data packet by bitwise XORing the determined plurality of data packets.

In step 307 the process ends.

Figure 4:
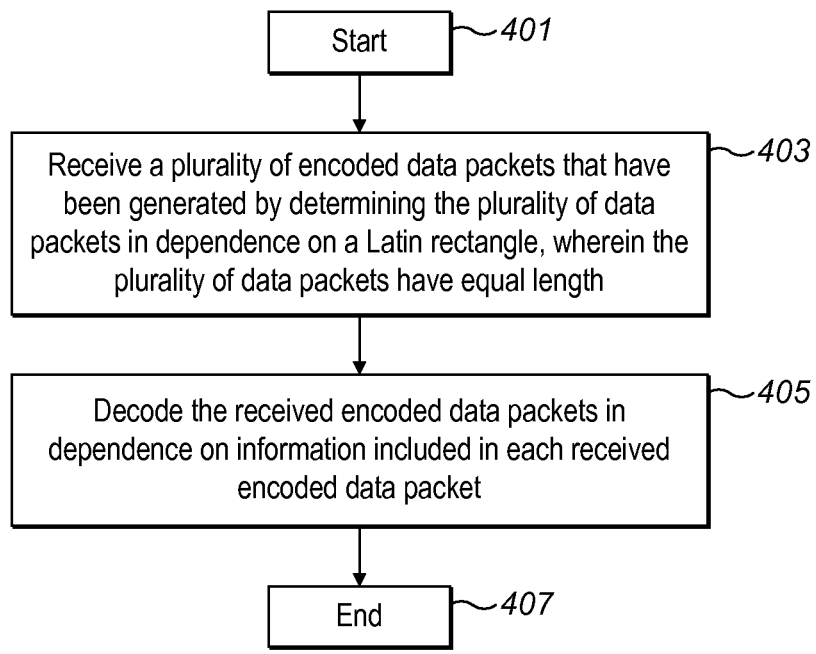
FIG. 4 is a flow chart of a method of decoding according to the first embodiment of the invention.

A method of decoding according to the first embodiment is described below with reference to FIG. 4.

In step 401, the process begins.

Step 403 comprises receiving a plurality of encoded data packets that have been generated by determining the plurality of data packets in dependence on a Latin rectangle, wherein the plurality of data packets have equal length.

Step 405 comprises decoding the received encoded data packets in dependence on information included in each received encoded data packet.

In step 407 the process ends.

In the first embodiment described above, only data packets that have been encoded according to the described embodiments are transmitted over a network. There is no transmission of data packets that are not encoded or any redundant data packets. In addition, the intermediate nodes within the network just relay the received encoded data packets onto other intermediate nodes or sink nodes (i.e. destinations) without further coding the data packets.

There is a trade off between the coding/decoding complexity and the security of the transmitted data. Preferably, the coding complexity is adjustable. That is to say, the average number of data packets required to generate an encoded data packet, or to decode a received encoded data packet, can be changed. Adjusting the coding complexity corresponds to changing the number of rows of the Latin rectangle that the data packets for encoding/decoding are selected in dependence on.

Advantageously, the encoding and decoding of data packets according to the first embodiment provides improved efficiency of encoding, decoding, and transmission of data packets, improved capacity, reduced energy requirements and improved security properties of the transmitted information.

A second embodiment is described below in which redundancy is introduced into the encoded data packets. Advantageously, in networks experiencing an unacceptably large amount of loss of data packets, the introduction of redundant data packets can improve the transmission performance of the network. The amount of redundancy introduced is adjustable, and can be increased or decreased in response to a determined network performance.

First, the incidence matrix of a Latin rectangle is used to compute coded packets by applying the techniques as described for of the first embodiment.

$$L = \begin{bmatrix} 4 & 5 & 2 & 3 & 6 & 1 \\ 3 & 2 & 4 & 6 & 1 & 5 \\ 6 & 4 & 1 & 2 & 5 & 3 \end{bmatrix}$$

$$M = \begin{bmatrix} 0 & 0 & 1 & 1 & 0 & 1 \\ 0 & 1 & 0 & 1 & 1 & 0 \\ 1 & 1 & 0 & 1 & 0 & 0 \\ 0 & 1 & 1 & 0 & 0 & 1 \\ 1 & 0 & 0 & 0 & 1 & 1 \\ 1 & 0 & 1 & 0 & 1 & 0 \end{bmatrix}$$

With no redundancy is added, the coded packets are:

$c[1]=x[3] \oplus x[4] \oplus x[6]$, $c[2]=x[2] \oplus x[4] \oplus x[5]$, $c[3]=x[1] \oplus x[2] \oplus x[4]$, $c[4]=x[2] \oplus x[3] \oplus x[6]$, $c[5]=x[1] \oplus x[5] \oplus x[6]$, $c[6]=x[1] \oplus x[3] \oplus x[5]$.

The generation of encoded data packets as described above has been performed according to the first embodiment. In order to introduce redundancy, it is determined to send four data packets and two redundant packets. The two redundant packets are defined as:

$x[5] \to x[1] \oplus x[2] \oplus x[4]$ $x[6] \to x[1] \oplus x[2] \oplus x[3] \oplus x[4]$ The redundant data packets are random independent linear combinations of the other data packets. Instead of x[5] and x[6], any of the other data packets could have been determined to be the redundant data packets.

The coded packets become:

$cr[1]=x[1] \oplus x[2]$, $cr[2]=x[1]$, $cr[3]=x[1] \oplus x[2] \oplus x[4]$, $cr[4]=x[1] \oplus x[4]$, $cr[5]=x[1] \oplus x[3]$, $cr[6]=x[2] \oplus x[3] \oplus x[4]$, The decoding at the destination nodes is based on the inverse matrix of the incidence matrix of the Latin rectangle.

In the above example of adding redundant data packets, if 2 of the transmitted packets are not received, the probability of successfully decoding without sending resend requests is 74%. If 1 packet is not received, all packets can be restored. This shows that the encoded data packets have the property of being Almost MDS (Maximum Distance Separable) codes.

Preferably, the redundant data packets are chosen to ensure that the probability of successfully decoding the received encoded data packets when one or more of the transmitted encoded data packets is not received is maximised, or close to being maximised.

The added amount of redundancy is adjustable. The data packets may be first encoded according to the first embodiment with no redundancy added. If it is determined that the loss of data packets within the network is unacceptable, redundancy can be introduced by applying the technique according to the second embodiment to introduce one or more redundant data packets. If the loss of data packets is still determined to be unacceptable, the encoding can be changed to use more redundant data packets. It the amount of loss of data packets within the network is determined to be low, the number of redundant data packets used may be decreased.

A preferred implementation of the second embodiment uses the above-described theory for generating a family of optimal binary non-MDS erasure codes.

To solve the problem of how to generate such codes, many heuristic optimization methodologies can be used for a search of approximate solutions. A preferred implementation uses a Stochastic Hill-Climbing Methodology, as described in Russel and P. Norvig, Artificial Intelligence: A Modern Approach, Pearson Education Inc., 2003. The hill climbing heuristics has been already used in optimizing problems for RLNC such as described in E. Kurdoglu, N. Thomos, and P. Frossard, Scalable video dissemination with prioritized network coding, In Multimedia and Expo (ICME), 2011 IEEE International Conference on, pages 1-6, 2011. In general, the stochastic heuristics is defined as in Algorithm ER1.

---

Algorithm ER1

---

Input. n and k
Output. A candidate Family C of Optimal Binary Non-MDS Erasure Codes
1. Find a random [n, k] linear binary code and compute its Vector of Exact Decoding Probability $V_D = (\ell_0, \ell_1, \ldots, \ell_{n-k})$ and its probability $p_s$ of successful decoding of k packets from the equation (ER3).
2. Repeatedly improve the solution until no more improvements are necessary/possible.

---

Embodiments improve on the Algorithm ER1 by constructing a generator matrix, G, in dependence on the matrix M as described above. The number of rows of G is k and the number of columns is n. The first k columns of G, and elements in these rows, are provided by M. The k+1 column has elements that are all '1'. The elements in the other columns of G are determined according to Algorithm ER2 below.

---

Algorithm ER2

---

Input. n and k
Output. A candidate Family C of Optimal Binary Non-MDS Erasure Codes
1. Find a random Balanced XOR code and put it as the first part of the generator matrix G of an [n, k] code. Set the k + 1-th column to consists of all 1s, and set the remaining columns with random values. Compute the Vector of Exact Decoding Probability $V_D = (\ell_0, \ell_1, \ldots, \ell_{n-k})$ and its probability $p_s$ of successful decoding of k packets from the equation (ER3).
2. Repeatedly improve the solution until no more improvements are necessary/possible.

---

For example, if M is:

$$M = \begin{bmatrix} 1 & 0 & 1 & 1 & 0 \\ 1 & 1 & 0 & 1 & 0 \\ 1 & 0 & 1 & 0 & 1 \\ 0 & 1 & 1 & 0 & 1 \\ 0 & 1 & 0 & 1 & 1 \end{bmatrix}$$

Then the Algorithm ER2 may generate G as:

$$G = \begin{bmatrix} 1 & 1 & 1 & 0 & 0 & 1 & 0 & 0 & 0 & 0 & 1 & 0 & 1 \\ 0 & 1 & 0 & 1 & 1 & 1 & 0 & 0 & 1 & 0 & 1 & 1 & 0 \\ 1 & 0 & 1 & 1 & 0 & 1 & 0 & 1 & 0 & 0 & 0 & 1 & 0 \\ 1 & 1 & 0 & 0 & 1 & 1 & 0 & 0 & 0 & 1 & 0 & 1 & 0 \\ 0 & 0 & 1 & 1 & 1 & 1 & 1 & 0 & 0 & 0 & 1 & 0 & 0 \end{bmatrix}$$

It is clear that the first 5 elements of each row of G respectively correspond to elements in each column of M. In the sixth column of G, all of the elements have the value '1'.

Algorithm ER2 is advantageous because although Algorithm ER1 can find codes with similar decoding probabilities as Algorithm ER2, Algorithm ER1 requires more stochastic search attempts. Moreover, the codes that Algorithm ER2 finds have advantages that they are structured, balanced and they are sparse, where the sparsity can go down to 3 non-zero positions.

According to a third embodiment, data packets are further coded by network nodes within the network.

The third embodiment is described with reference to FIGS. 5 to 8.

The network comprises a source, S, sink nodes 1 and 2, and five intermediate nodes, I1 to I5, arranged between the source nodes and the sink nodes. The transmitted encoded data packets by the source, have all been generated according to the first embodiment and they do not contain any redundant data packets. The transmitted encoded data packets are c[1] to c[6] as were generated above in the second embodiment prior to any redundancy being applied.

Figure 5:
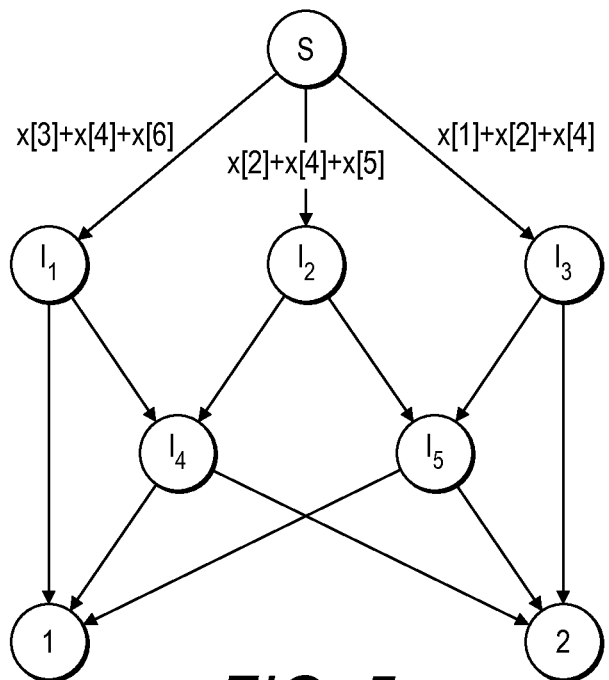
FIG. 5 shows the transmission of encoded data packets over a network according to a third embodiment of the invention.

As shown in FIG. 5, in a first phase, the source respectively transmits c[1], c[2] and c[3] to intermediate nodes I1, I2 and I3 in the network.

Figure 6:
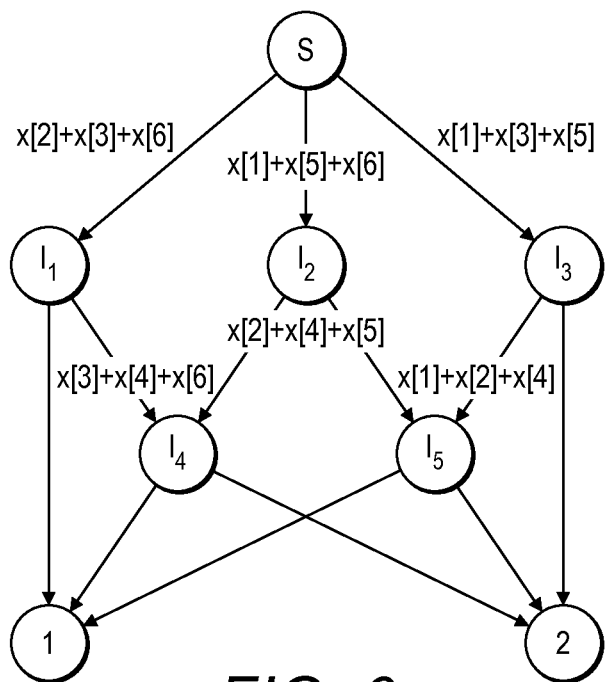
FIG. 6 shows the transmission of encoded data packets over a network according to the third embodiment of the invention.

The second phase is shown in FIG. 6. The source respectively transmits c[4], c[5] and c[6] to intermediate nodes I1, I2 and I3 in the network.

Sink node 1 receives c[1] from I1. Sink node 2 receives c[3] from I3.

Intermediate node I4 receives c[1] and c[2] from I1 and I2. I4 performs a bitwise XOR operation on the received encoded data packets to generate a further coded data packet for transmission in the next phase. The further coded data packet is:

$c[1] \oplus c[2] = x[2] \oplus x[3] \oplus x[5] \oplus x[6]$

Intermediate node I5 receives c[2] and c[3] from I2 and I3. I5 performs a bitwise XOR operation on the received encoded data packets to generate a further coded data packet for transmission in the next phase. The further coded data packet is:

$c[2] \oplus c[3] = x[1] \oplus x[5]$

Figure 7:
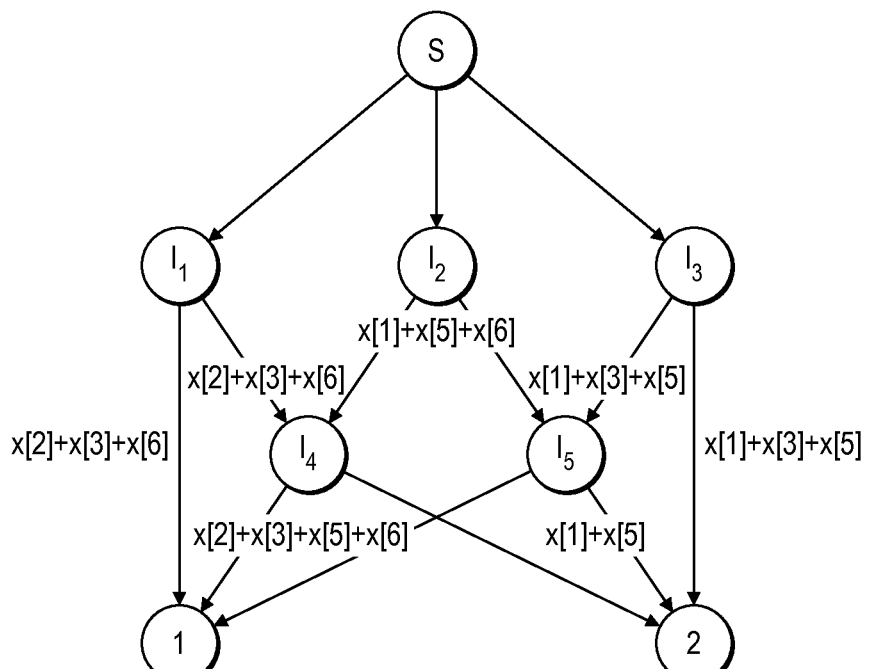
FIG. 7 shows the transmission of encoded data packets over a network according to the third embodiment of the invention.

The third phase is shown in FIG. 7. The source has transmitted c[1] to c[6] in the first and second phases and does not transmit any further encoded data packets. I4 and I5 each transmit the further coded data packets that they have generated in the previous phase to each of the sink nodes. All of the intermediate nodes continue operate as described above and forward data packets received in the previous phase to other nodes in the network. I4 and I5 both generate further coded data packets by XORing all of the received data packets.

Figure 8:
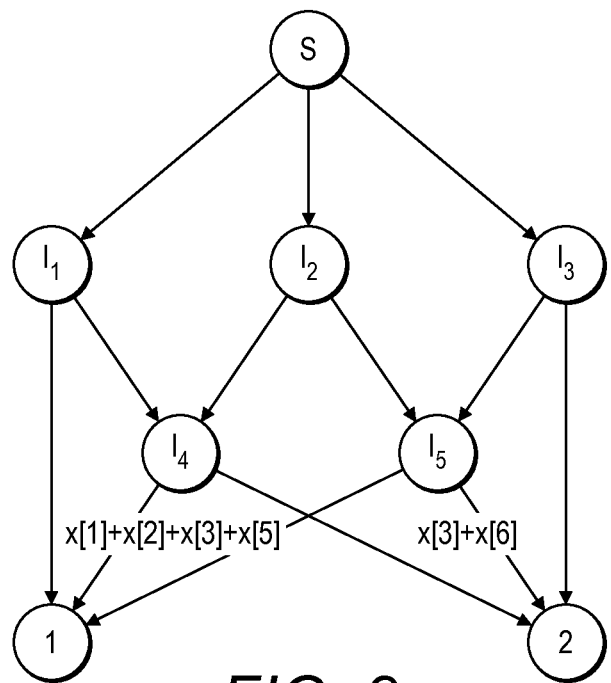
FIG. 8 shows the transmission of encoded data packets over a network according to the third embodiment of the invention.

At the end of the third phase, sink node 1 has received:

$x[3] \oplus x[4] \oplus x[6]$, $x[2] \oplus x[3] \oplus x[5] \oplus x[6]$, $x[1] \oplus x[5]$, $x[2] \oplus x[3] \oplus x[6]$ Sink node 2 has received:

$x[1] \oplus x[2] \oplus x[4]$, $x[2] \oplus x[3] \oplus x[5] \oplus x[6]$, $x[1] \oplus x[5]$, $x[1] \oplus x[3] \oplus x[5]$ The fourth phase is shown in FIG. 8. The source has transmitted c[1] to c[6] in the first and second phases and does not transmit any further encoded data packets. All of the intermediate nodes continue operate as described above. Since I1, I2 and I3 have not received any data packets in the previous phase, they do not transmit any data packets. I4 and I5 each transmit the further coded data packets that they have generated in the previous phase to each of the sink nodes.

At the end of the fourth phase, sink node 1 has received:

$x[3] \oplus x[4] \oplus x[6]$, $x[2] \oplus x[3] \oplus x[5] \oplus x[6]$, $x[1] \oplus x[5]$, $x[2] \oplus x[3] \oplus x[6]$, $x[1] \oplus x[2] \oplus x[3] \oplus x[5]$, $x[3] \oplus x[6]$ Sink node 2 has received:

$x[1] \oplus x[2] \oplus x[4]$, $x[2] \oplus x[3] \oplus x[5] \oplus x[6]$, $x[1] \oplus x[5]$ $x[1] \oplus x[3] \oplus x[5]$ $x[1] \oplus x[2] \oplus x[3] \oplus x[5]$, $x[3] \oplus x[6]$ It is clear from the above that each of the sink nodes has received 6 encoded data packets, each encoded data packet received by a single sink node being generated in dependence on a different combination of source (i.e. not encoded) data packets. The diversity in how the received encoded data packets have been generated allows the sink nodes to decode the received encoded data packets and recover the source data packets.

In all of the above-described embodiments, it is necessary for a sink node to know the source data packets that an encoded data packet has been generated in dependence on in order for the encoded data packet to be usable in the decoding process.

Accordingly, each encoded data packet comprises additional information that describes how many original source data packets exist in total for the encoding and information on which sources data packets the encoded data packet has been generated in dependence on.

The additional information may have the format {N, N-bit register}, where N is the number of source packets. For example, if the source encodes 6 packets x[1], x[2], ... x[6], if one of the encoded data packets is c[1]=x[3]⊕x[4]⊕x[6], then the additional information for the encoded data packet containing c[1] is {6,001101}. If the i-th bit of the N-bit register is a '1', this indicates that the encoded data packet has been generated in dependence on the i-th source data packet, otherwise the i-th bit is zero.

The additional information may be prepended to the encoded data packed, i.e. attached at the head of the packet, appended to the end of the data packet, or in any other way comprised by the data packet.

In a preferred implementation, the network nodes buffer, i.e. store, the additional information of each data packet that they receive and transmit, and, optionally, the payload of each data packet. FIGS. 9 to 12 show the additional information for the same transmission over a network of encoded data packets c[1] to c[6] as shown in FIGS. 5 to 8.

Figure 9:
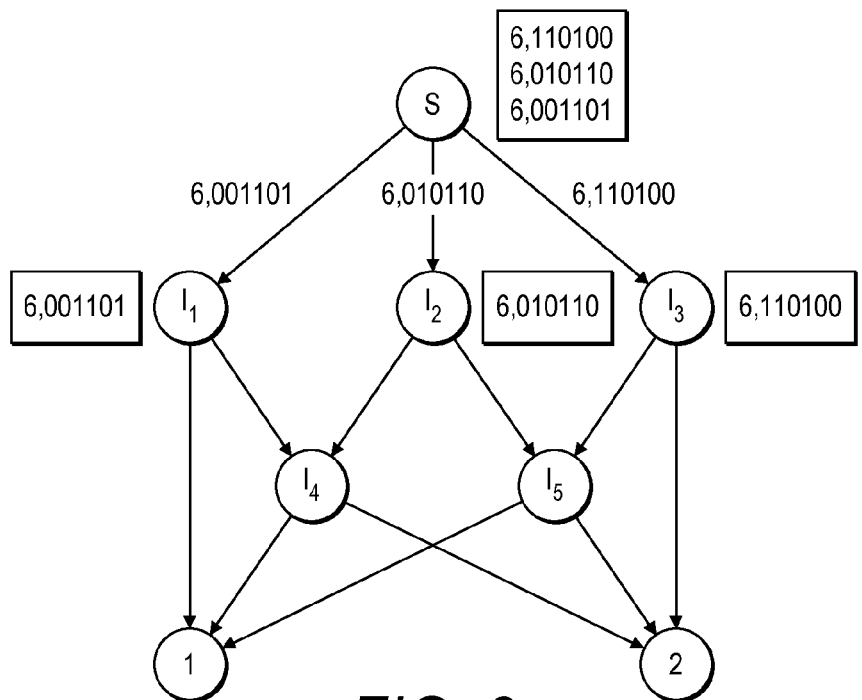
FIG. 9 shows information buffered in each of the nodes of a network according to the third embodiment of the invention.

FIG. 9 shows the first phase and the additional information buffered in each of the nodes of the network.

Figure 10:
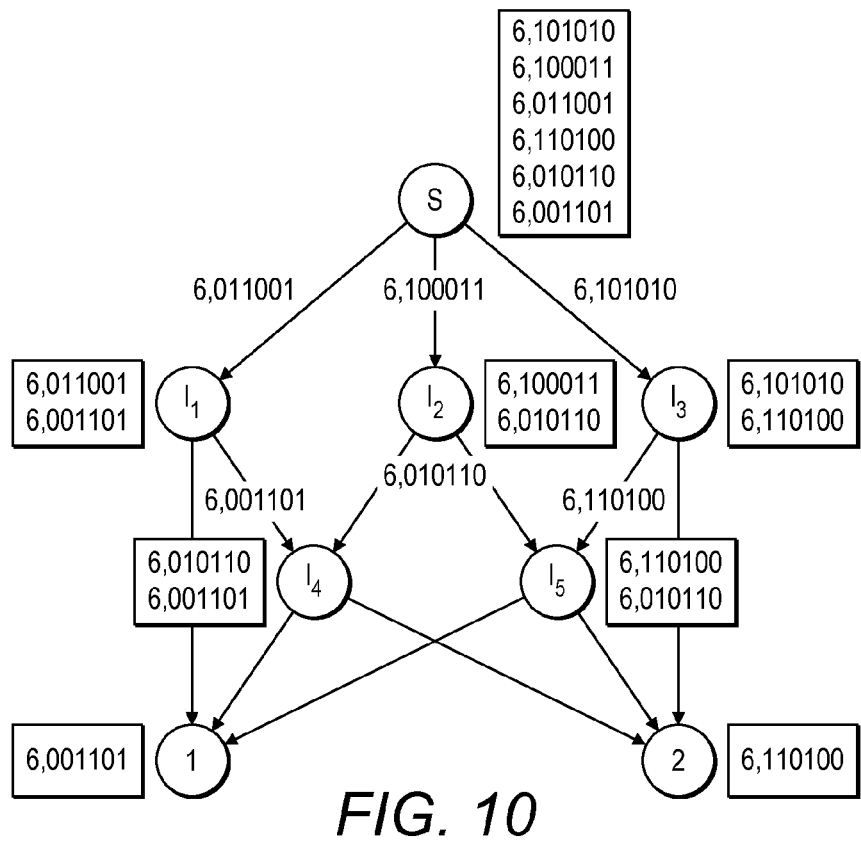
FIG. 10 shows information buffered in each of the nodes of a network according to the third embodiment of the invention.

FIG. 10 shows the second phase and the additional information buffered in each of the nodes of the network. The buffers of the nodes comprise the additional information of both the encoded data packets transmitted and received in the first phase and those transmitted and received in the second phase.

Figure 11:
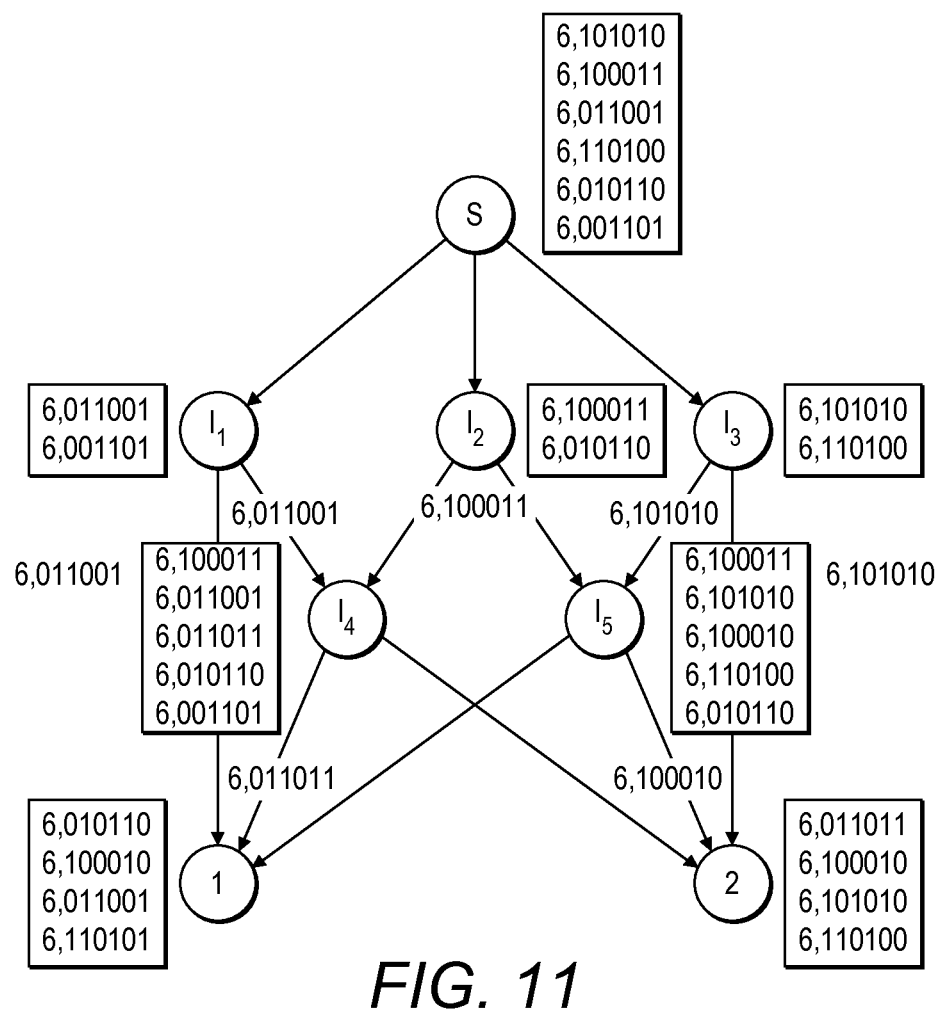
FIG. 11 shows information buffered in each of the nodes of a network according to the third embodiment of the invention.

FIG. 11 shows the third phase and the additional information buffered in each of the nodes of the network. The buffers of the nodes comprise the additional information of the encoded data packets transmitted and received in the first, second and third phases.

Figure 12:
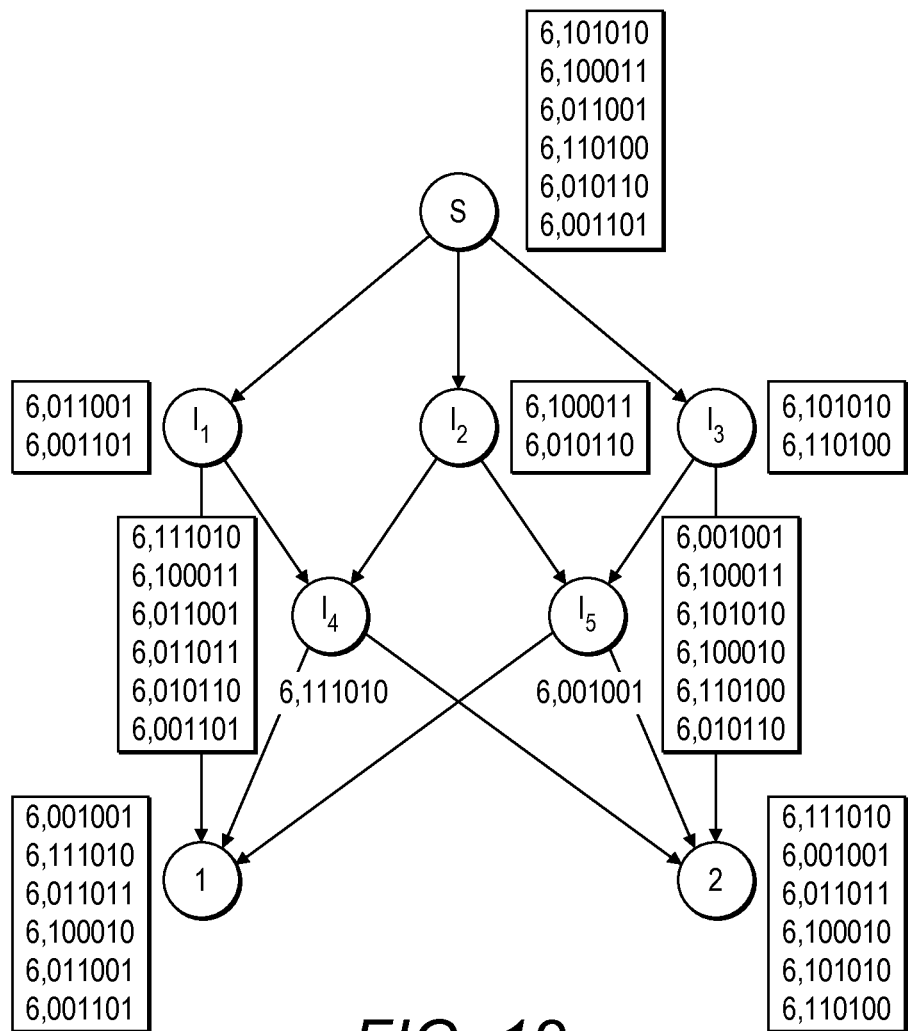
FIG. 12 shows information buffered in each of the nodes of a network according to the third embodiment of the invention.

FIG. 12 shows the fourth phase and the additional information buffered in each of the nodes of the network. The buffers of the nodes comprise the additional information of the encoded data packets transmitted and received in the first, second, third and fourth phases.

The additional information of the received encoded data packets at sink node 1 can be used to generate a column of a matrix, M1:

$$M1 = \begin{bmatrix} 0 & 1 & 0 & 1 & 0 & 0 \\ 0 & 1 & 1 & 0 & 1 & 0 \\ 1 & 1 & 1 & 0 & 1 & 1 \\ 0 & 0 & 0 & 0 & 0 & 1 \\ 0 & 1 & 1 & 1 & 0 & 0 \\ 1 & 0 & 1 & 0 & 1 & 1 \end{bmatrix}$$

Similarly, the additional information of the received encoded data packets at sink node 2 can be used to generate a column of a matrix, M2:

$$M2 = \begin{bmatrix} 1 & 0 & 0 & 1 & 1 & 1 \\ 1 & 0 & 1 & 0 & 0 & 1 \\ 1 & 1 & 1 & 0 & 1 & 0 \\ 0 & 0 & 0 & 0 & 0 & 1 \\ 1 & 0 & 1 & 1 & 1 & 0 \\ 0 & 1 & 1 & 0 & 0 & 0 \end{bmatrix}$$

The rank of M1 and M2 can be calculated and, for both M1 and M2, is 6. Each sink node therefore has sufficient information to decode the received encoded data packets and thereby obtain the source data packets.

In order for a received encoded data packet to contribute to a decoding process at a sink node, it is necessary for the received encoded data packet to be linearly independent from any previously received encoded data packets by the sink node.

In a preferred implementation, each intermediate node of the network node tries to ensure that all of the further coded data packets that it transmits are different from any previously transmitted encoded data packets by the node. Each intermediate node therefore compares the additional information buffered in the node with the additional information of an encoded data packet that it has generated. The intermediate node can then determine to transmit the encoded data packet if the result of the comparison indicates that the encoded data packet has not been transmitted or received by the node before. If the generated encoded data has been transmitted or received by the node before, the node can repeat the processes of generating and comparing encoded data packets with the aim of eventually generating an encoded data packet that has not been transmitted or received by the node before. An intermediate node that receives encoded data packets over more than two links is able to select a number of different combinations of the received encoded data packets for XORing and can therefore generate a number of different further coded data packets for transmitting from the node.

Coding over GF(2) allows a large number of different encoded data packets to be generated. If the data is partitioned in n encoded data packets, then the total number of possible innovative packets is $2^n-1$. This result follows from the arithmetic in GF(2) with n packets being related to the number of nonempty subsets of a set with n elements.

Figure 13:
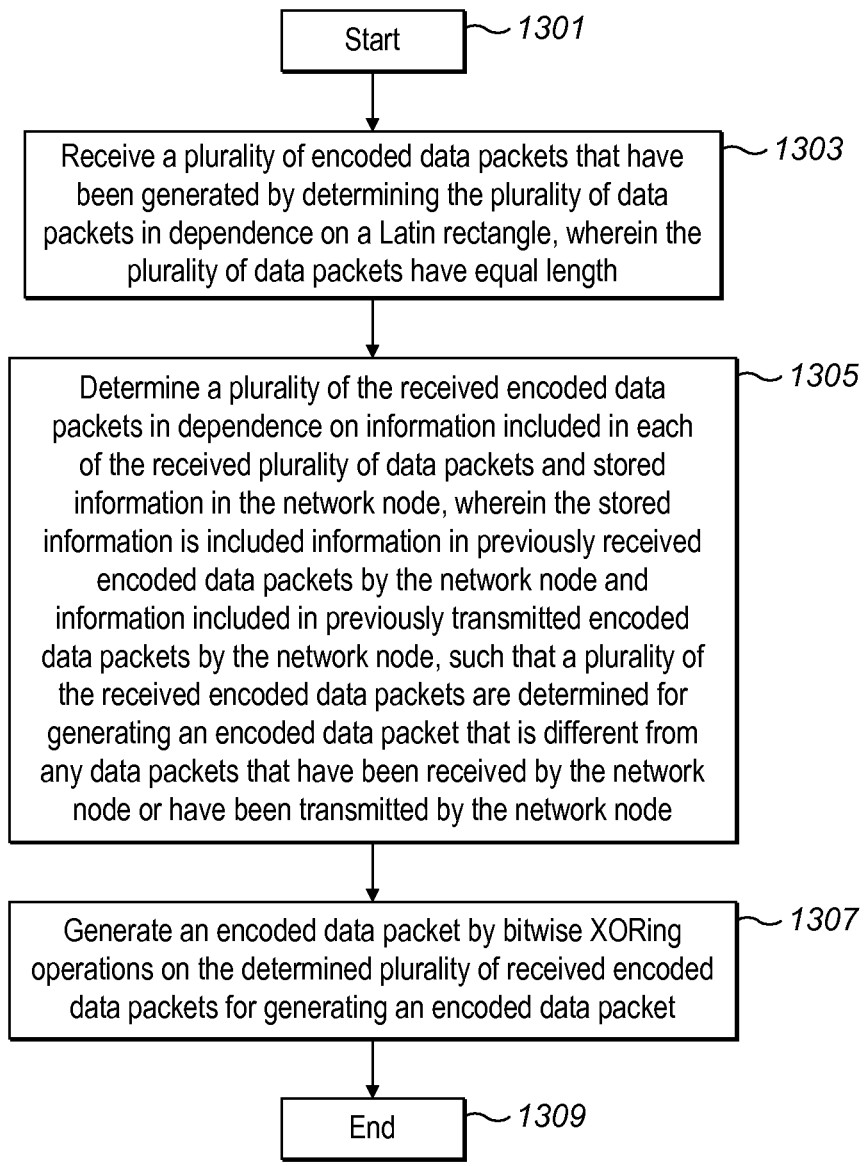
FIG. 13 is a flow chart of a method according to the third embodiment of the invention.

A method according to the third embodiment is described below with reference to FIG. 13.

In step 1301, the process begins.

Step 1303 comprises receiving a plurality of encoded data packets that have been generated by determining the plurality of data packets in dependence on a Latin rectangle, wherein the plurality of data packets have equal length.

Step 1305 comprises determining a plurality of the received encoded data packets in dependence on information included in each of the received plurality of data packets and stored information in the network node, wherein the stored information is included information in previously received encoded data packets by the network node and information included in previously transmitted encoded data packets by the network node, such that a plurality of the received encoded data packets are determined for generating an encoded data packet that is different from any data packets that have been received by the network node or have been transmitted by the network node.

Step 1307 comprises generating an encoded data packet by performing bitwise XOR operations on the determined plurality of received encoded data packets for generating an encoded data packet.

In step 309 the process ends.

Figure 14:
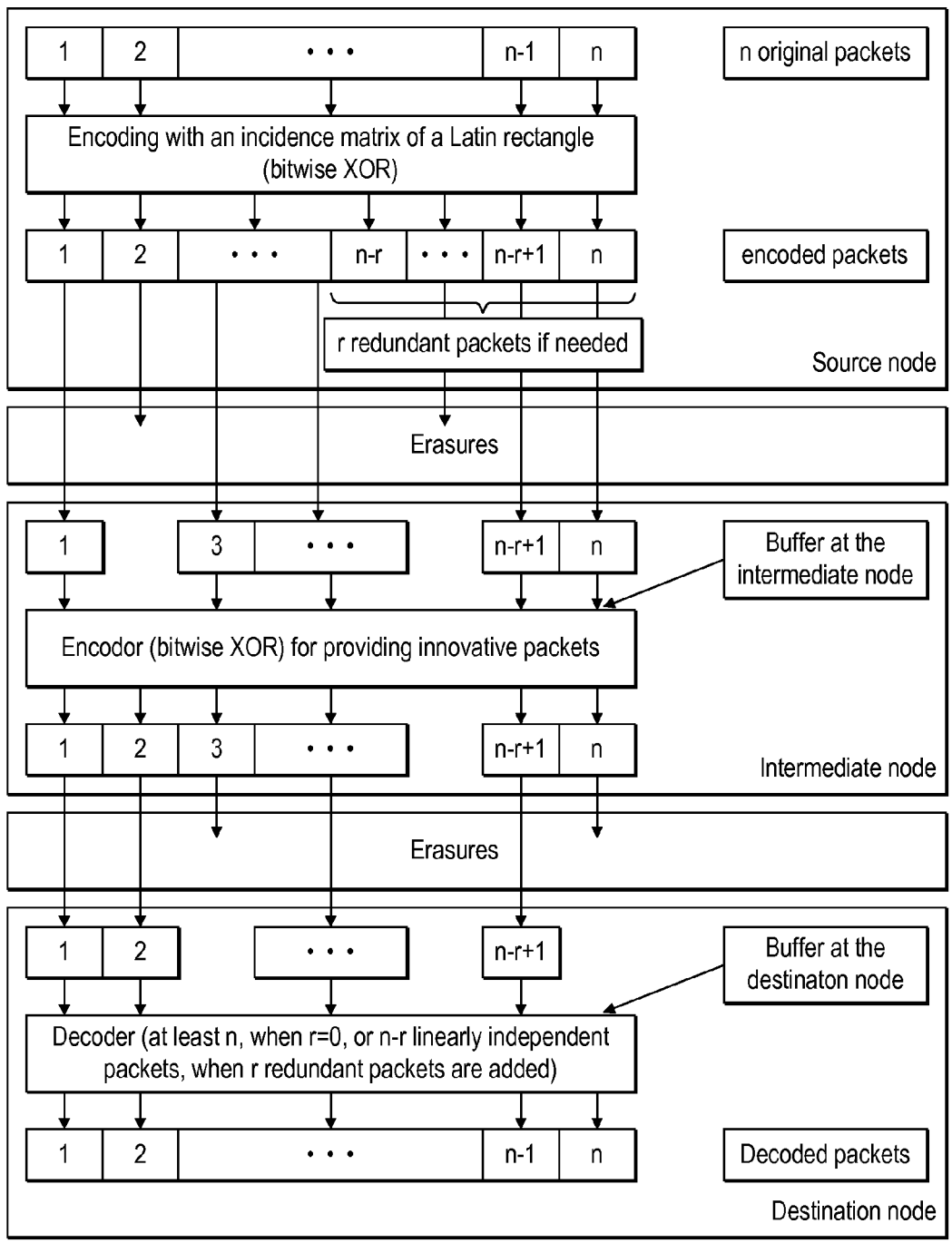
FIG. 14 shows a system according to embodiments of the invention.

A person skilled in the art would know how to implement of all the mathematical theory and operations described throughout the present document with the use of one or more computing devices. An overview of a preferred system according to embodiments is provided below with reference to FIG. 14.

Shown are a source node, and intermediate node and a destination node.

An encoder encodes n original packets. The encoder creates n encoded packets, by an XOR-ed combination of packets determined in dependence on a Latin rectangle. If redundancy is applied, then r redundant packets are added. Each encoded data packet comprises information indicating which of the original packets have been used to generate the encoded data packet. This information is preferably prepended as a header of each encoded data packet.

The n encoded packets are then transmitted. The transmission may occur over a number of phases. A number of the data packets will be lost, i.e. erasures occur, if the channel is lossy.

Further coding may be performed by intermediate nodes in the network. If the intermediate nodes perform further coding, they do not decode the packets. The intermediate nodes may, however, check the information in each packet's header in order to preferably ensure that the node combines received data packets, by bitwise XOR operations, to generate a new data packet.

The destination node buffers the received encoded data packets until enough data packets have been received for reconstructing the original data. Reconstruction is possible so long as the decoder collects at least n (when r=0) or n−r (when r redundant packets are added) linearly independent packets.

An advantage provided by embodiments of the invention is that data packets are combined, and further encoding by network nodes is performed, by using bitwise XOR operations. This is faster and more energy efficient than other network coding approaches that require performing a multiplication.

The encoding, decoding and transmission of data packets according to embodiments offers all the benefits that are achieved by RLNC as well as low complexity and energy efficiency.

Table 2 shows a comparison of RLNC and balanced XOR-ed network coding according to an embodiment.

TABLE 2

Comparison between RLNC and Balanced XOR-ed NC

| Code Capabilities | RLNC | Balanced XOR-ed NC |
|---|---|---|
| Erasure correction | ✓ | ✓ |
| Code is carried within each packet | ✓ | ✓ |
| Completely distributed operation | ✓ | Partially centralized |
| De-code using both unencoded and coded packets | ✓ | ✓ |
| Able to generate valid codes from coded or unencoded packets | ✓ | ✓ |
| Composability without decoding (adding incremental redundancy) | ✓ | ✓ |
| Encode data in a sliding window | ✓ | ✓ |
| Low coding complexity | x | ✓ |
| Energy efficiency | x | ✓ |

A comparison of the complexity of the techniques according to embodiments and known techniques is shown in Table 3.

TABLE 3

|  | RLNC | Traditional XOR | Triangular Coding | Embodiments |
|---|---|---|---|---|
| Encoding Complexity | $O(M^2B)$ | $O(CMmB)$ | $O(M^2B)$ | $O(M\ Bm)$ |
| Decoding Complexity | $O(M^2B + M^3)$ | $O(MmB)$ | $O(M^2B)$ | $O(M\ Bm)$ |
| Packet Overhead (bits) | $Mq$ | $M$ | $M + M[\log_2 M]$ | $M + \log_2 M$ |
| Packet feedback | Not required | Required | Not required | Not required |

In Table 3:

q—a field size,

G—a constant complexity of generating a random number,

M—number of original packets;

B—number of bits in a packet, m—bits at location j (traditional XOR); the number of rows in the Latin rectangle according to embodiments.

The results in Tables 2 and 3 clearly demonstrate advantages of embodiments of the invention.

The network coding according to the embodiments described herein is applicable to data transmission in all kinds of networks, including: wireless, optical, and storage networks.

A preferred application of the encoding and decoding techniques according to embodiments is for implementing erasure codes in a data storage system. These are described in, for example, 'Erasure Codes for Storage Systems—A Brief Primer', by James S. Plank, http://web.eecs.utk.edu/~plank/plank/papers/Login-2013.pdf (viewed on 20 May 2014), the entire contents of which are incorporated herein by reference. Embodiments are used to generate and store coding words. These reduce the likelihood of irrecoverable data loss in the event of the failure of one or more disks, or parts of disks, of the storage system.

Another preferred application of the encoding and decoding techniques according to embodiments is Peer-to-Peer streaming of video and/or audio data. This is described in, for example, 'Network Coding Based Live Peer-to-Peer Streaming Towards Minimizing Buffering Delay', by Zhiming Zhang, Ranran Hou, Hao Chen, Jin Zhou and Jun Liu, http://security.riit.tsinghua.edu.cn/share/NC-P2P.pdf (viewed on 20 May 2014), the entire contents of which are incorporated herein by reference. The network coding techniques of embodiments are used to reduce buffering delay of live P2P streaming.

Modifications and Variations

A number of modifications and variations are possible within the scope of the invention as defined by the appended claims.

The encoding according to embodiments can be applied to either finite or infinite streams of binary data. So that coding can be implemented, the data is split into data packets. The data packets prior to coding are referred to as source data packets or original data packets. It is known to generate sub packets by splitting any size of data packet into smaller packets. The data packets described throughout the present document, and used in embodiments of the invention, may be data packets of any size and, although referred to as just data packets, may have been generated as sub packets of larger packets. An advantage of using a small data packet size is that the number of data packets that can combined by XOR operations is increased and the probability that a generated data packet is an innovative packet is therefore increased.

In the above-described embodiments, encoded data packets are transmitted, with or without redundancy being added. Embodiments also include transmission schemes that additionally transmit original data packets without any encoding or data packets that have been encoded with a different type of coding.

Throughout the present document, the number of packets n that are sent from the source is equal to the number of columns in the Latin square or Latin rectangle, with the number of rows corresponding to another parameter. The mathematical theory could also have been presented such that the Latin rectangle was constructed with the number of rows being equal to the number of packets n that are sent from the source and the number of columns corresponding to the other parameter.

The flowcharts and description thereof herein should not be understood to prescribe a fixed order of performing the method steps described therein. Rather the method steps may be performed in any order practicable. Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

The invention claimed is:

1. A computer-implemented method of generating a plurality of encoded data packets over GF(2), the method comprising a method of generating a plurality of different encoded data packets over GF(2), the method of generating a plurality of different encoded data packets comprising generating each encoded data packet by:

determining (303) a plurality of data packets in dependence on values in a Latin rectangle that are different for each generated encoded data packet, wherein the plurality of data packets have equal length; and generating (305) the encoded data packet by bitwise XORing the determined plurality of data packets for improving efficiency of data packet encoding and decoding;

the method further comprising generating the plurality of encoded data packets by:

determining a plurality of data packets for encoding, wherein each of the plurality of data packets is of equal length;

determining, for each of a plurality of encoded data packets to be generated, one or more of the plurality of data packets in dependence on the Latin rectangle;

generating each of a plurality of encoded data packets by:

determining an encoded data packet to be the one data packet determined for the encoded data packet when only one data packet is determined for the encoded data packet, and generating an encoded data packet by bitwise XORing the determined plurality of data packets for the encoded data packet when a plurality of data packets are determined for the encoded data packet;

wherein the method of generating a plurality of encoded data packets further comprises:

determining a first dimension of the Latin rectangle in dependence on the number of encoded data packets to be generated for the plurality of data packets to be encoded; and determining a second dimension of the Latin rectangle in dependence on a desired number of data packets that would generate each encoded data packet if redundancy was not applied, wherein the second dimension is less than the first dimension; and performing at least one of the following: a) transmitting the encoded data packets over a network; and b) storing the encoded data packets.

2. The method according to claim 1, further comprising: applying redundancy by determining one or more of the data packets to be encoded to be one or more redundant data packets, wherein each redundant data packet is one of the other data packets or a random linear combination of a plurality of the other data packets.

3. The method according to claim 2, further comprising: determining one or more of the other data packets for generating each redundant data packet such that each generated redundant data packet is different from the other generated redundant data packets; and generating each redundant data packet by bitwise XORing the data packets determined for generating the redundant data packet, when a plurality of data packets are determined for generating the redundant data packet.

4. The method according to claim 3, wherein determining one or more of the other data packets for generating each redundant data packet comprises determining the one or more of the other data packets so that they maximise the probability of the encoded data packets being successfully decoded if one or more of the encoded data packets is not received by a decoder.

5. The method according to claim 1, further comprising including information in each generated encoded data packet, wherein the included information indicates at least the one or more data packets that the encoded data packet has been generated in dependence on.

6. A method of decoding a plurality of encoded data packets over GF(2), the method comprising:
receiving (403) a plurality of encoded data packets that have been generated according to the method of claim 5;
decoding (405) the received encoded data packets in dependence on information included in each received encoded data packet.

7. A destination node for receiving encoded data packets from a network, the destination node comprising a computing device configured to perform the method of claim 6.

8. A method in a network node for generating an encoded data packet over GF(2), wherein the network node comprises stored information on included information in previously received encoded data packets by the network node and information included in previously transmitted encoded data packets by the network node, the method comprising the network node:
receiving (1303) a plurality of encoded data packets that have been generated according to the method of claim 5;
determining (1305) a plurality of the received encoded data packets in dependence on information included in each of the received plurality of data packets and the stored information in the network node, such that a plurality of the received encoded data packets are determined for generating an encoded data packet that is different from any data packets that have been received by the network node or have been transmitted by the network node; and generating (1307) an encoded data packet by performing bitwise XOR operations on the determined plurality of received encoded data packets for generating an encoded data packet;

and, optionally, the method further comprises the network node:
including information in each encoded data packet generated by the network node that indicates the data packets that the encoded data packet has been generated in dependence on;
transmitting each generated encoded data packet with the included information; and
storing the included information in each encoded data packet received by the network node and transmitted by the network node.

9. A network node for receiving and transmitting encoded data packets over a network, the network node comprising a computing device configured to perform the method of claim 8.

10. The method according to claim 1, further comprising changing the second dimension of the Latin rectangle such that the second dimension is increased in response to a determination to increase the decoding complexity of the encoded data packets, and the second dimension of the Latin rectangle is decreased in response to a determination to decrease the encoding complexity of the encoded data packets.

11. The method according to claim 1 further comprising:
generating a Latin rectangle; and
generating a non-singular matrix of binary values in dependence on the Latin rectangle;
wherein the one or more data packets for generating each encoded data packet are determined in dependence on said non-singular matrix of binary values.

12. The method according to claim 11, further comprising:
generating the Latin rectangle by generating a Latin Square; and
selecting a plurality of either the rows or the columns of the Latin Square.

13. A source for generating encoded data packets, the source comprising a computing device configured to perform the method of claim 12.

14. A network comprising a source according to claim 13, and a destination node for receiving encoded data packets from a network, the destination node being configured to perform a method of decoding a plurality of encoded data packets over GF(2), the method of decoding a plurality of encoded data packets comprising:
receiving (403) a plurality of encoded data packets that have been generated according to a method of generating a plurality of encoded data packets over GF(2); and
decoding (405) the received encoded data packets in dependence on information included in each received encoded data packet,
wherein the method of generating a plurality of encoded data packets comprises generating each encoded data packet by:
determining (303) a plurality of data packets in dependence on values in a Latin rectangle that are different for each generated encoded data packet, wherein the plurality of data packets have equal length; and
generating (305) the encoded data packet by bitwise XORing the determined plurality of data packets,
wherein the plurality of encoded data packets are generated by:

determining a plurality of data packets for encoding, wherein each of the plurality of data packets is of equal length;

determining, for each of a plurality of encoded data packets to be generated, one or more of the plurality of data packets in dependence on the Latin rectangle;

generating each of a plurality of encoded data packets by:

determining an encoded data packet to be the one data packet determined for the encoded data packet when only one data packet is determined for the encoded data packet; and generating an encoded data packet by bitwise XORing the determined plurality of data packets for the encoded data packet when a plurality of data packets are determined for the encoded data packet; and including information in each generated encoded data packet, wherein the included information indicates at least the one or more data packets that the encoded data packet has been generated in dependence on.

15. The method according to claim 1, further comprising:
generating a Latin rectangle;
generating a non-singular matrix of binary values in dependence on the Latin rectangle; and
determining the inverse of the non-singular matrix of binary values;
wherein the one or more data packets for generating each encoded data packet are determined in dependence on said inverse of the non-singular matrix of binary values.

16. The method according to claim 1, further comprising:
performing the method in a source of data packets in the network; and
transmitting the encoded data packets over the network.

17. The method according to claim 16, further comprising:
buffering one or more of the encoded data packets prior to the one or more buffered encoded data packets being transmitted; and
transmitting the encoded data packets in a series of phases.

18. A method in a network, the network comprising a source node, one or more intermediate nodes and at least one destination node, wherein there are a plurality of different routes between the source node and the destination node, the method comprising:
generating, by the source node, a plurality of encoded data packets according to the method of claim 1; and
transmitting one or more of the plurality of different encoded data packets between the source and destination nodes over a first route between the source and destination nodes; and
transmitting one or more other data packets of the plurality of different encoded data packets between the source and destination node over a second route between the source and destination nodes.

19. The method according to claim 1, comprising a) transmitting the encoded data packets over the network, wherein the network is a storage network.

* * * * *